US008192283B2

(12) United States Patent
Ruppert et al.

(10) Patent No.: US 8,192,283 B2
(45) Date of Patent: Jun. 5, 2012

(54) NETWORKED GAMING SYSTEM INCLUDING A LIVE FLOOR VIEW MODULE

(75) Inventors: Ryan Ruppert, Reno, NV (US); Farshid Atashband, Carson City, NV (US); Saurabh Singh, Reno, NV (US); Christopher P. Arbogast, Reno, NV (US); Randy Phillips, Gardnerville, NV (US); Mark Lowell, Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 280 days.

(21) Appl. No.: 12/620,404

(22) Filed: Nov. 17, 2009

(65) Prior Publication Data

US 2010/0234104 A1 Sep. 16, 2010

Related U.S. Application Data

(60) Provisional application No. 61/158,755, filed on Mar. 10, 2009.

(51) Int. Cl.
*A63F 13/00* (2006.01)

(52) U.S. Cl. ................................ 463/31; 463/30; 463/32

(58) Field of Classification Search .............. 463/30–32, 463/40–42
See application file for complete search history.

(56) References Cited

U.S. PATENT DOCUMENTS

| | | | | |
|---|---|---|---|---|
| 3,766,452 | A | 10/1973 | Burpee et al. | 317/262 R |
| 4,026,309 | A | 5/1977 | Howard | 133/8 R |
| 4,339,798 | A | 7/1982 | Hedges et al. | 364/412 |
| 4,373,726 | A | 2/1983 | Churchill et al. | 273/138 A |
| 4,531,187 | A | 7/1985 | Uhland | 364/412 |
| 4,592,377 | A | 6/1986 | Paulsen et al. | 133/5 R |
| 4,725,079 | A | 2/1988 | Koza et al. | 283/73 |
| 4,755,941 | A | 7/1988 | Bacchi | 364/412 |
| 4,832,341 | A | 5/1989 | Muller et al. | 273/139 |
| 4,861,041 | A | 8/1989 | Jones et al. | 273/292 |
| 4,948,138 | A | 8/1990 | Pease et al. | 273/138 A |
| 5,007,641 | A | 4/1991 | Seidman | 273/138 A |
| 5,083,800 | A | 1/1992 | Lockton | 273/439 |
| 5,179,517 | A | 1/1993 | Sarbin et al. | 364/410 |

(Continued)

FOREIGN PATENT DOCUMENTS

DE 4439502 C1 9/1995

(Continued)

OTHER PUBLICATIONS

Bally Technologies, Inc., iVIEW, http://ballytech.com/systems/product.cfm?id=9, download date Nov. 6, 2007, 2 pages.

(Continued)

*Primary Examiner* — Dmitry Suhol
*Assistant Examiner* — David Duffy
(74) *Attorney, Agent, or Firm* — Seed IP Law Group PLLC

(57) ABSTRACT

A networked gaming system includes one or more gaming machines connected to a network, a network-connected user station having a user interface and a display. The networked gaming system further includes a host computer system having an environment module enabled to capture, analyze, and present both historical data stored in at least one data storage device and real-time gaming data from the gaming machines in accordance with one or more requests from the user station.

9 Claims, 29 Drawing Sheets

U.S. PATENT DOCUMENTS 5,199,710 A 4/1993 Lamle ........ 273/149 R
5,258,837 A 11/1993 Gormley ........ 358/140
5,275,400 A 1/1994 Weingardt et al. ........ 273/85 CP
5,324,035 A 6/1994 Morris et al. ........ 273/138 A
5,326,104 A 7/1994 Pease et al. ........ 273/138 A
5,364,104 A 11/1994 Jones et al. ........ 273/292
5,386,103 A 1/1995 DeBan et al. ........ 235/379
5,397,133 A 3/1995 Penzias ........ 273/439
5,398,932 A 3/1995 Eberhardt et al. ........ 273/138 A
5,472,194 A 12/1995 Breeding et al. ........ 273/138 A
5,493,613 A 2/1996 Denno et al. ........ 380/24
5,505,449 A 4/1996 Eberhardt et al. ........ 273/138 A
5,507,489 A 4/1996 Reibel et al. ........ 273/138 A
5,562,284 A 10/1996 Stevens ........ 273/139
5,580,311 A 12/1996 Haste, III ........ 463/29
5,586,936 A 12/1996 Bennett et al. ........ 463/25
5,605,334 A 2/1997 McCrea, Jr. ........ 273/309
5,605,506 A 2/1997 Hoorn et al. ........ 463/47
5,613,680 A 3/1997 Groves et al. ........ 273/138.2
5,613,912 A 3/1997 Slater ........ 463/25
5,643,086 A 7/1997 Alcorn et al. ........ 463/29
5,643,088 A 7/1997 Vaughn et al. ........ 463/40
5,651,548 A 7/1997 French et al. ........ 273/309
5,655,961 A 8/1997 Acres et al. ........ 463/27
5,707,287 A 1/1998 McCrea, Jr. ........ 463/27
5,735,525 A 4/1998 McCrea, Jr. ........ 273/309
5,735,742 A 4/1998 French ........ 463/25
5,737,418 A 4/1998 Saffari et al. ........ 380/9
5,741,183 A 4/1998 Acres et al. ........ 463/42
5,742,656 A 4/1998 Mikulak et al. ........ 377/7
5,759,102 A 6/1998 Pease et al. ........ 463/42
5,770,533 A 6/1998 Franchi ........ 463/42
5,779,545 A 7/1998 Berg et al. ........ 463/22
5,785,321 A 7/1998 van Putten et al. ........ 273/309
5,800,268 A 9/1998 Molnick ........ 463/40
5,801,766 A 9/1998 Alden ........ 348/157
5,803,808 A 9/1998 Strisower ........ 463/11
5,809,482 A 9/1998 Strisower ........ 705/30
5,813,912 A 9/1998 Shultz ........ 463/25
5,823,534 A 10/1998 Banyai ........ 273/269
5,823,879 A 10/1998 Goldberg et al. ........ 463/42
5,830,067 A 11/1998 Graves et al. ........ 463/40
5,830,068 A 11/1998 Brenner et al. ........ 463/42
5,831,669 A 11/1998 Adrain ........ 348/143
5,842,921 A 12/1998 Mindes et al. ........ 463/16
5,850,447 A 12/1998 Peyret ........ 380/25
5,851,149 A 12/1998 Xidos et al. ........ 463/42
5,890,963 A 4/1999 Yen ........ 463/42
5,909,876 A 6/1999 Brown ........ 273/309
5,911,626 A 6/1999 McCrea, Jr. ........ 463/27
5,919,090 A 7/1999 Mothwurf ........ 463/25
5,924,926 A 7/1999 Brown ........ 463/11
5,936,527 A 8/1999 Isaacman et al. ........ 340/572.1
5,941,769 A 8/1999 Order ........ 463/12
5,957,776 A 9/1999 Hoehne ........ 463/25
5,971,851 A 10/1999 Pascal et al. ........ 463/24
5,999,808 A 12/1999 LaDue ........ 455/412
6,001,016 A 12/1999 Walker et al. ........ 463/42
6,021,949 A 2/2000 Boiron ........ 235/492
6,042,150 A 3/2000 Daley ........ 283/86
6,068,553 A 5/2000 Parker ........ 463/27
6,077,161 A 6/2000 Wisler ........ 463/11
6,080,063 A 6/2000 Khosla ........ 463/42
6,089,980 A 7/2000 Gauselmann ........ 463/27
6,093,103 A 7/2000 McCrea, Jr. ........ 463/27
6,102,799 A 8/2000 Stupak ........ 463/27
6,104,815 A 8/2000 Alcorn et al. ........ 380/251
6,106,396 A 8/2000 Alcorn et al. ........ 463/29
6,110,041 A 8/2000 Walker et al. ........ 463/20
6,110,043 A 8/2000 Olsen ........ 463/27
6,117,012 A 9/2000 McCrea, Jr. ........ 463/27
6,126,166 A 10/2000 Lorson et al. ........ 273/148 R
6,135,887 A 10/2000 Pease et al. ........ 463/42
6,146,273 A 11/2000 Olsen ........ 463/27
6,149,522 A 11/2000 Alcorn et al. ........ 463/29
6,152,824 A 11/2000 Rothschild et al. ........ 463/42
6,154,131 A 11/2000 Jones, II et al. ........ 340/540
6,165,069 A 12/2000 Sines et al. ........ 463/12
6,166,763 A 12/2000 Rhodes et al. ........ 348/143
6,168,523 B1 1/2001 Piechowiak et al. ........ 463/26
6,183,366 B1 2/2001 Goldberg et al. ........ 463/42
6,186,892 B1 2/2001 Frank et al. ........ 463/19
6,186,895 B1 2/2001 Oliver ........ 463/25
6,210,277 B1 4/2001 Stefan ........ 463/27
6,217,447 B1 4/2001 Lofink et al. ........ 463/12
6,219,836 B1 4/2001 Wells et al. ........ 717/11
6,234,898 B1 5/2001 Belamant et al. ........ 463/25
6,244,958 B1 6/2001 Acres ........ 463/26
6,251,014 B1 6/2001 Stockdale et al. ........ 463/16
6,254,484 B1 7/2001 McCrea, Jr. ........ 463/27
6,264,109 B1 7/2001 Chapet et al. ........ 235/492
6,264,561 B1 7/2001 Saffari et al. ........ 463/42
6,267,671 B1 7/2001 Hogan ........ 463/25
6,275,586 B1 8/2001 Kelly ........ 380/46
6,283,856 B1 9/2001 Mothwurf ........ 463/17
6,287,202 B1 9/2001 Pascal et al. ........ 463/42
6,299,534 B1 10/2001 Breeding et al. ........ 463/25
6,313,871 B1 11/2001 Schubert ........ 348/143
6,346,044 B1 2/2002 McCrea, Jr. ........ 463/27
6,383,076 B1 5/2002 Tiedeken ........ 463/40
6,394,900 B1 5/2002 McGlone et al. ........ 463/20
6,400,272 B1 6/2002 Holtzman et al. ........ 340/572.1
6,409,602 B1 6/2002 Wiltshire et al. ........ 463/42
6,439,996 B2 8/2002 LeMay et al. ........ 463/29
6,443,839 B2 9/2002 Stockdale et al. ........ 463/16
6,446,864 B1 9/2002 Kim et al. ........ 235/382
6,460,848 B1 10/2002 Soltys et al. ........ 273/149 R
6,464,584 B2 10/2002 Oliver ........ 463/25
6,488,581 B1 12/2002 Stockdale ........ 463/29
6,488,585 B1 12/2002 Wells et al. ........ 463/43
6,503,147 B1 1/2003 Stockdale et al. ........ 463/29
6,505,772 B1 1/2003 Mollett et al. ........ 235/379
6,508,709 B1 1/2003 Karmarkar ........ 463/42
6,508,710 B1 1/2003 Paravia et al. ........ 463/42
6,514,140 B1 2/2003 Storch ........ 463/25
6,517,435 B2 2/2003 Soltys et al. ........ 463/25
6,517,436 B2 2/2003 Soltys et al. ........ 463/29
6,517,437 B1 2/2003 Wells et al. ........ 463/30
6,520,857 B2 2/2003 Soltys et al. ........ 463/29
6,527,271 B2 3/2003 Soltys et al. ........ 273/148 R
6,527,638 B1 3/2003 Walker et al. ........ 463/25
6,530,836 B2 3/2003 Soltys et al. ........ 463/29
6,530,837 B2 3/2003 Soltys et al. ........ 463/29
6,533,276 B2 3/2003 Soltys et al. ........ 273/148 R
6,533,662 B2 3/2003 Soltys et al. ........ 463/25
6,567,159 B1 5/2003 Corech ........ 356/71
6,575,829 B2 6/2003 Coleman et al. ........ 463/20
6,575,833 B1 6/2003 Stockdale ........ 463/29
6,575,834 B1 6/2003 Lindo ........ 463/40
6,578,847 B1 6/2003 Hedrick et al. ........ 273/138.2
6,579,180 B2 6/2003 Soltys et al. ........ 463/25
6,579,181 B2 6/2003 Soltys et al. ........ 463/25
6,581,747 B1 6/2003 Charlier et al. ........ 194/214
6,585,598 B2 7/2003 Nguyen et al. ........ 463/41
6,595,857 B2 7/2003 Soltys et al. ........ 463/29
6,607,441 B1 8/2003 Acres ........ 463/25
6,609,978 B1 8/2003 Paulsen ........ 463/42
6,612,928 B1 9/2003 Bradford et al. ........ 463/29
6,620,046 B2 9/2003 Rowe ........ 463/25
6,628,939 B2 9/2003 Paulsen ........ 455/414
6,629,184 B1 9/2003 Berg et al. ........ 710/306
6,629,591 B1 10/2003 Griswold et al. ........ 194/205
6,629,889 B2 10/2003 Mothwurf ........ 463/25
6,638,161 B2 10/2003 Soltys et al. ........ 463/12
6,638,169 B2 10/2003 Wilder et al. ........ 463/35
6,638,170 B1 10/2003 Crumby ........ 463/42
6,641,484 B2 11/2003 Oles et al. ........ 463/47
6,645,077 B2 11/2003 Rowe ........ 463/42
6,652,378 B2 11/2003 Cannon et al. ........ 463/20
6,663,490 B2 12/2003 Soltys et al. ........ 463/25
6,675,152 B1 1/2004 Prasad et al. ........ 705/64
6,676,522 B2 1/2004 Rowe et al. ........ 463/42
6,682,421 B1 1/2004 Rowe et al. ........ 463/25
6,682,423 B2 1/2004 Brosnan et al. ........ 463/29
6,685,564 B2 2/2004 Oliver ........ 463/25
6,685,567 B2 2/2004 Cockerille et al. ........ 463/43
6,688,979 B2 2/2004 Soltys et al. ........ 463/25

| | | | | |
|---|---|---|---|---|
| 6,699,128 | B1 | 3/2004 | Beadell et al. | 463/46 |
| 6,702,291 | B2 | 3/2004 | Grebler et al. | 273/292 |
| 6,702,672 | B1 | 3/2004 | Angell et al. | 463/25 |
| 6,712,696 | B2 | 3/2004 | Soltys et al. | 463/25 |
| 6,726,099 | B2 | 4/2004 | Becker et al. | 235/380 |
| 6,728,740 | B2 | 4/2004 | Kelly et al. | 708/250 |
| 6,729,956 | B2 | 5/2004 | Wolf et al. | 463/25 |
| 6,739,975 | B2 | 5/2004 | Nguyen et al. | 463/39 |
| 6,743,102 | B1 | 6/2004 | Fiechter et al. | 463/42 |
| 6,746,330 | B2 | 6/2004 | Cannon | 463/25 |
| 6,752,312 | B1 | 6/2004 | Chamberlain et al. | 235/375 |
| 6,755,741 | B1 | 6/2004 | Rafaeli | 463/25 |
| 6,758,751 | B2 | 7/2004 | Soltys et al. | 463/29 |
| 6,800,029 | B2 | 10/2004 | Rowe et al. | 463/25 |
| 6,811,488 | B2 | 11/2004 | Paravia et al. | 463/42 |
| 6,817,948 | B2 | 11/2004 | Pascal et al. | 463/42 |
| 6,823,419 | B2 | 11/2004 | Berg et al. | 710/306 |
| 6,837,789 | B2 | 1/2005 | Garahi et al. | 463/29 |
| 6,846,238 | B2 | 1/2005 | Wells | 463/39 |
| 6,848,994 | B1 | 2/2005 | Knust et al. | 463/25 |
| 6,866,581 | B2 | 3/2005 | Martinek et al. | 463/16 |
| 6,866,586 | B2 | 3/2005 | Oberberger et al. | 463/42 |
| 6,884,170 | B2 * | 4/2005 | Rowe | 463/31 |
| 6,884,174 | B2 | 4/2005 | Lundy et al. | 463/42 |
| 6,896,618 | B2 | 5/2005 | Benoy et al. | 463/25 |
| 6,899,627 | B2 | 5/2005 | Lam et al. | 463/40 |
| 6,905,411 | B2 | 6/2005 | Nguyen et al. | 463/25 |
| 6,962,530 | B2 | 11/2005 | Jackson | 463/29 |
| 6,971,956 | B2 | 12/2005 | Rowe et al. | 463/25 |
| 6,972,682 | B2 | 12/2005 | Lareau et al. | 340/568.1 |
| 6,997,803 | B2 | 2/2006 | LeMay et al. | 463/20 |
| 7,005,985 | B1 | 2/2006 | Steeves | 340/572.1 |
| 7,029,009 | B2 | 4/2006 | Grauzer et al. | 273/149 P |
| 7,035,626 | B1 | 4/2006 | Luciano, Jr. | 455/414.1 |
| 7,062,470 | B2 | 6/2006 | Prasad et al. | 705/64 |
| 7,086,947 | B2 | 8/2006 | Walker et al. | 463/25 |
| 7,099,035 | B2 | 8/2006 | Brooks et al. | 358/1.15 |
| 7,112,138 | B2 | 9/2006 | Hedrick et al. | 463/29 |
| 7,114,718 | B2 | 10/2006 | Grauzer et al. | 273/149 R |
| 7,116,782 | B2 | 10/2006 | Jackson et al. | 380/251 |
| 7,147,558 | B2 | 12/2006 | Giobbi | 463/25 |
| 7,168,089 | B2 | 1/2007 | Nguyen et al. | 726/4 |
| 7,179,170 | B2 | 2/2007 | Martinek et al. | 463/29 |
| 7,186,181 | B2 | 3/2007 | Rowe | 463/42 |
| 7,197,765 | B2 | 3/2007 | Chan et al. | 726/8 |
| 7,198,571 | B2 | 4/2007 | LeMay et al. | 463/25 |
| RE39,644 | E | 5/2007 | Alcorn et al. | 380/251 |
| 7,213,812 | B2 | 5/2007 | Schubert et al. | 273/149 R |
| 7,271,727 | B2 | 9/2007 | Steeves | 340/572.7 |
| 7,291,068 | B2 | 11/2007 | Bryant et al. | 463/25 |
| 7,300,352 | B2 * | 11/2007 | Rowe | 463/32 |
| 7,303,475 | B2 | 12/2007 | Britt et al. | 463/42 |
| 7,309,065 | B2 | 12/2007 | Yoseloff et al. | 273/292 |
| 7,311,605 | B2 | 12/2007 | Moser | 463/25 |
| 7,316,615 | B2 | 1/2008 | Soltys et al. | 463/25 |
| 7,331,520 | B2 | 2/2008 | Silva et al. | 235/381 |
| 7,351,147 | B2 | 4/2008 | Stockdale et al. | 463/29 |
| 7,384,339 | B2 | 6/2008 | LeMay et al. | 463/30 |
| 7,390,256 | B2 | 6/2008 | Soltys et al. | 463/12 |
| 7,398,327 | B2 | 7/2008 | Lee | 709/250 |
| 7,404,765 | B2 | 7/2008 | Soltys et al. | 463/25 |
| 7,407,438 | B2 | 8/2008 | Schubert et al. | 463/22 |
| 7,410,422 | B2 | 8/2008 | Fine | 463/42 |
| 7,419,428 | B2 | 9/2008 | Rowe | 463/25 |
| 7,427,233 | B2 | 9/2008 | Walker et al. | 463/16 |
| 7,434,805 | B2 | 10/2008 | Grauzer et al. | 273/149 R |
| 7,435,179 | B1 | 10/2008 | Ford | 463/42 |
| 7,438,643 | B2 | 10/2008 | Brosnan et al. | 463/42 |
| 7,455,591 | B2 | 11/2008 | Nguyen | 463/42 |
| 7,460,863 | B2 | 12/2008 | Steelberg et al. | 455/419 |
| 7,500,915 | B2 | 3/2009 | Wolf et al. | 463/27 |
| 7,510,474 | B2 | 3/2009 | Carter, Sr. | 463/29 |
| 7,515,718 | B2 | 4/2009 | Nguyen et al. | 380/278 |
| 7,534,169 | B2 | 5/2009 | Amaitis et al. | 463/39 |
| 7,549,576 | B2 | 6/2009 | Alderucci et al. | 235/380 |
| 7,559,080 | B2 | 7/2009 | Bhargavan et al. | 726/1 |
| 7,575,234 | B2 | 8/2009 | Soltys et al. | 273/149 R |
| 7,577,847 | B2 | 8/2009 | Nguyen et al. | 713/186 |
| 7,578,739 | B2 | 8/2009 | Gauselmann | 463/27 |

| | | | | |
|---|---|---|---|---|
| 7,585,217 | B2 | 9/2009 | Lutnick et al. | 463/16 |
| 7,611,407 | B1 | 11/2009 | Itkis et al. | 463/29 |
| 7,611,409 | B2 | 11/2009 | Muir et al. | 463/29 |
| 7,617,151 | B2 | 11/2009 | Rowe | 705/39 |
| 7,629,886 | B2 | 12/2009 | Steeves | 340/572.1 |
| 7,634,550 | B2 | 12/2009 | Wolber et al. | 709/220 |
| 7,637,810 | B2 | 12/2009 | Amaitis et al. | 463/25 |
| 7,644,861 | B2 | 1/2010 | Alderucci et al. | 235/382 |
| 7,648,414 | B2 | 1/2010 | McNutt et al. | 463/25 |
| 7,682,249 | B2 | 3/2010 | Winans et al. | 463/31 |
| 7,684,874 | B2 | 3/2010 | Schlottmann et al. | 700/9 |
| 7,685,593 | B2 | 3/2010 | Solomon et al. | 717/170 |
| 7,686,681 | B2 | 3/2010 | Soltys et al. | 463/11 |
| 7,686,688 | B2 | 3/2010 | Friedman et al. | 463/25 |
| 7,690,995 | B2 | 4/2010 | Frankulin et al. | 463/41 |
| 7,699,697 | B2 | 4/2010 | Darrah et al. | 463/16 |
| 7,699,703 | B2 | 4/2010 | Muir et al. | 463/29 |
| 7,722,453 | B2 | 5/2010 | Lark et al. | 463/16 |
| 7,736,236 | B2 | 6/2010 | Soltys et al. | 463/47 |
| 7,744,462 | B2 | 6/2010 | Grav et al. | 463/27 |
| 7,753,779 | B2 | 7/2010 | Shayesteh | 463/25 |
| 7,753,790 | B2 | 7/2010 | Nguyen et al. | 463/42 |
| 7,769,877 | B2 | 8/2010 | McBride et al. | 709/230 |
| 7,771,272 | B2 | 8/2010 | Soltys et al. | 463/25 |
| 7,780,525 | B2 | 8/2010 | Walker et al. | 463/29 |
| 7,780,526 | B2 | 8/2010 | Nguyen et al. | 463/29 |
| 7,783,881 | B2 | 8/2010 | Morrow et al. | 713/165 |
| 7,824,267 | B2 | 11/2010 | Cannon et al. | 463/42 |
| 7,828,649 | B2 | 11/2010 | Cuddy et al. | 463/26 |
| 8,073,657 | B2 * | 12/2011 | Moore et al. | 703/1 |
| 2001/0019966 | A1 | 9/2001 | Idaka | 463/40 |
| 2002/0063389 | A1 | 5/2002 | Breeding et al. | 273/292 |
| 2002/0111213 | A1 | 8/2002 | McEntee et al. | 463/42 |
| 2002/0113371 | A1 | 8/2002 | Snow | 273/292 |
| 2002/0115487 | A1 | 8/2002 | Wells | 463/42 |
| 2002/0142846 | A1 | 10/2002 | Paulsen | 463/43 |
| 2002/0152120 | A1 * | 10/2002 | Howington | 705/14 |
| 2003/0004871 | A1 | 1/2003 | Rowe | 705/39 |
| 2003/0032474 | A1 | 2/2003 | Kaminkow | 463/25 |
| 2003/0042679 | A1 | 3/2003 | Snow | 273/292 |
| 2003/0064798 | A1 | 4/2003 | Grauzer et al. | 463/29 |
| 2003/0075869 | A1 | 4/2003 | Breeding et al. | 273/292 |
| 2003/0078103 | A1 | 4/2003 | LeMay et al. | 463/43 |
| 2003/0090064 | A1 | 5/2003 | Hoyt et al. | 273/292 |
| 2003/0104865 | A1 | 6/2003 | Itkis et al. | 463/39 |
| 2003/0130024 | A1 | 7/2003 | Darby | 463/13 |
| 2003/0195037 | A1 | 10/2003 | Vuong et al. | 463/29 |
| 2003/0203755 | A1 | 10/2003 | Jackson | 463/42 |
| 2003/0212597 | A1 | 11/2003 | Ollins | 705/14 |
| 2003/0224858 | A1 | 12/2003 | Yoseloff et al. | 463/43 |
| 2003/0228908 | A1 * | 12/2003 | Caiafa et al. | 463/42 |
| 2003/0228912 | A1 | 12/2003 | Wells et al. | 463/43 |
| 2003/0232651 | A1 | 12/2003 | Huard et al. | 463/42 |
| 2004/0005920 | A1 | 1/2004 | Soltys et al. | 463/25 |
| 2004/0029635 | A1 | 2/2004 | Giobbi | 463/30 |
| 2004/0043815 | A1 | 3/2004 | Kaminkow | 463/25 |
| 2004/0043820 | A1 | 3/2004 | Schlottmann | 463/43 |
| 2004/0048671 | A1 | 3/2004 | Rowe | 463/42 |
| 2004/0068654 | A1 | 4/2004 | Cockerille et al. | 713/168 |
| 2004/0082385 | A1 | 4/2004 | Silva et al. | 463/40 |
| 2004/0087375 | A1 | 5/2004 | Gelinotte | 463/47 |
| 2004/0092310 | A1 | 5/2004 | Brosnan et al. | 463/42 |
| 2004/0106452 | A1 | 6/2004 | Nguyen et al. | 463/42 |
| 2004/0110119 | A1 | 6/2004 | Riconda et al. | 434/350 |
| 2004/0127291 | A1 | 7/2004 | George et al. | 463/42 |
| 2004/0133485 | A1 | 7/2004 | Schoonmaker et al. | 705/30 |
| 2004/0142744 | A1 | 7/2004 | Atkinson et al. | 463/29 |
| 2004/0185936 | A1 | 9/2004 | Block et al. | 463/42 |
| 2004/0219982 | A1 | 11/2004 | Khoo et al. | 463/42 |
| 2004/0229682 | A1 | 11/2004 | Gelinotte | 463/25 |
| 2005/0026680 | A1 | 2/2005 | Gururajan | 463/25 |
| 2005/0043094 | A1 | 2/2005 | Nguyen et al. | 463/42 |
| 2005/0051965 | A1 | 3/2005 | Gururajan | 273/292 |
| 2005/0054408 | A1 | 3/2005 | Steil et al. | 463/11 |
| 2005/0054438 | A1 | 3/2005 | Rothschild et al. | 463/29 |
| 2005/0070358 | A1 | 3/2005 | Angell et al. | 463/39 |
| 2005/0116020 | A1 | 6/2005 | Smolucha et al. | 235/375 |
| 2005/0119052 | A1 | 6/2005 | Russell et al. | 463/42 |
| 2005/0124411 | A1 | 6/2005 | Schneider et al. | 463/29 |

| | | | | |
|---|---|---|---|---|
| 2005/0153778 | A1 | 7/2005 | Nelson et al. | 463/42 |
| 2005/0164761 | A1 | 7/2005 | Tain | 463/13 |
| 2005/0176507 | A1 | 8/2005 | Ephrati | 463/39 |
| 2005/0239542 | A1 | 10/2005 | Olsen | 463/27 |
| 2005/0282626 | A1 | 12/2005 | Manfredi et al. | 463/25 |
| 2005/0288083 | A1 | 12/2005 | Downs, III | 463/11 |
| 2005/0288084 | A1 | 12/2005 | Schubert | 463/11 |
| 2005/0288085 | A1 | 12/2005 | Schubert et al. | 463/11 |
| 2006/0004618 | A1 | 1/2006 | Brixius | 705/8 |
| 2006/0009282 | A1 | 1/2006 | George et al. | 463/29 |
| 2006/0019745 | A1 | 1/2006 | Benbrahim | 463/29 |
| 2006/0035707 | A1 | 2/2006 | Nguyen et al. | 463/29 |
| 2006/0046849 | A1 | 3/2006 | Kovacs | 463/39 |
| 2006/0055945 | A1* | 3/2006 | Fazakerly | 358/1.9 |
| 2006/0116208 | A1 | 6/2006 | Chen et al. | 463/43 |
| 2006/0121970 | A1 | 6/2006 | Khal | 463/16 |
| 2006/0183541 | A1 | 8/2006 | Okada et al. | 463/29 |
| 2006/0199649 | A1 | 9/2006 | Soltys et al. | 463/47 |
| 2006/0205508 | A1 | 9/2006 | Green | 463/40 |
| 2006/0247013 | A1 | 11/2006 | Walker et al. | 463/20 |
| 2006/0252530 | A1* | 11/2006 | Oberberger et al. | 463/29 |
| 2006/0277487 | A1 | 12/2006 | Poulsen et al. | 715/772 |
| 2007/0004500 | A1 | 1/2007 | Soltys et al. | 463/22 |
| 2007/0015583 | A1 | 1/2007 | Tran | 463/40 |
| 2007/0054740 | A1 | 3/2007 | Salls et al. | 463/42 |
| 2007/0057453 | A1 | 3/2007 | Soltys et al. | 273/149 P |
| 2007/0057454 | A1 | 3/2007 | Fleckenstein | 273/149 R |
| 2007/0057469 | A1 | 3/2007 | Grauzer et al. | 273/309 |
| 2007/0060259 | A1 | 3/2007 | Pececnik | 463/16 |
| 2007/0060307 | A1 | 3/2007 | Mathis et al. | 463/25 |
| 2007/0060365 | A1 | 3/2007 | Tien et al. | 463/42 |
| 2007/0082737 | A1 | 4/2007 | Morrow et al. | 463/42 |
| 2007/0093298 | A1 | 4/2007 | Brunet | 463/42 |
| 2007/0111775 | A1 | 5/2007 | Yoseloff | 463/16 |
| 2007/0111791 | A1 | 5/2007 | Arbogast et al. | 463/40 |
| 2007/0111794 | A1 | 5/2007 | Hogan et al. | 463/42 |
| 2007/0117608 | A1 | 5/2007 | Roper et al. | 463/16 |
| 2007/0129145 | A1 | 6/2007 | Blackburn et al. | 463/42 |
| 2007/0167235 | A1 | 7/2007 | Naicker | 463/42 |
| 2007/0191102 | A1 | 8/2007 | Coliz et al. | 463/42 |
| 2007/0192748 | A1 | 8/2007 | Martin et al. | 715/856 |
| 2007/0198418 | A1 | 8/2007 | MacDonald et al. | 705/52 |
| 2007/0208816 | A1 | 9/2007 | Baldwin et al. | 709/206 |
| 2007/0218998 | A1 | 9/2007 | Arbogast et al. | 463/42 |
| 2007/0235521 | A1 | 10/2007 | Mateen et al. | 235/379 |
| 2007/0241497 | A1 | 10/2007 | Soltys et al. | 273/149 R |
| 2007/0241498 | A1 | 10/2007 | Soltys | 273/149 R |
| 2007/0243925 | A1 | 10/2007 | LeMay et al. | 463/20 |
| 2007/0243927 | A1 | 10/2007 | Soltys | 463/25 |
| 2007/0243935 | A1 | 10/2007 | Huizinga | 463/42 |
| 2007/0259711 | A1 | 11/2007 | Thomas | 463/22 |
| 2007/0287535 | A1 | 12/2007 | Soltys | 463/29 |
| 2007/0298868 | A1 | 12/2007 | Soltys | 463/25 |
| 2008/0004108 | A1 | 1/2008 | Klinkhammer | 463/29 |
| 2008/0038035 | A1 | 2/2008 | Shuldman et al. | 400/76 |
| 2008/0058105 | A1* | 3/2008 | Combs et al. | 463/42 |
| 2008/0070652 | A1* | 3/2008 | Nguyen et al. | 463/1 |
| 2008/0076536 | A1 | 3/2008 | Shayesteh | 463/25 |
| 2008/0076572 | A1 | 3/2008 | Nguyen et al. | 463/42 |
| 2008/0090651 | A1 | 4/2008 | Baerlocher | 463/27 |
| 2008/0096659 | A1 | 4/2008 | Kreloff et al. | 463/39 |
| 2008/0113764 | A1 | 5/2008 | Soltys | 463/22 |
| 2008/0113773 | A1 | 5/2008 | Johnson et al. | 463/25 |
| 2008/0113781 | A1 | 5/2008 | Soltys et al. | 463/28 |
| 2008/0119284 | A1 | 5/2008 | Luciano, Jr. et al. | 463/42 |
| 2008/0138773 | A1* | 6/2008 | Lathrop | 434/72 |
| 2008/0146337 | A1 | 6/2008 | Halonen et al. | 463/42 |
| 2008/0153599 | A1 | 6/2008 | Atashband et al. | 463/42 |
| 2008/0153600 | A1 | 6/2008 | Swarna | 463/43 |
| 2008/0154916 | A1 | 6/2008 | Atashband | 707/10 |
| 2008/0155665 | A1 | 6/2008 | Ruppert et al. | 726/5 |
| 2008/0162729 | A1 | 7/2008 | Ruppert | 709/249 |
| 2008/0171588 | A1 | 7/2008 | Atashband | 463/20 |
| 2008/0171598 | A1 | 7/2008 | Deng | 463/40 |
| 2008/0200255 | A1 | 8/2008 | Eisele | 463/42 |
| 2008/0243697 | A1 | 10/2008 | Irving et al. | 705/54 |
| 2008/0261699 | A1* | 10/2008 | Topham et al. | 463/42 |
| 2008/0306840 | A1* | 12/2008 | Houlihan et al. | 705/28 |
| 2008/0311971 | A1 | 12/2008 | Dean | 463/20 |
| 2009/0005176 | A1 | 1/2009 | Morrow et al. | 463/43 |
| 2009/0054139 | A1* | 2/2009 | Anderson | 463/31 |
| 2009/0115133 | A1 | 5/2009 | Kelly et al. | 273/274 |
| 2009/0117994 | A1 | 5/2009 | Kelly et al. | 463/25 |
| 2009/0118001 | A1 | 5/2009 | Kelly et al. | 463/29 |
| 2009/0118005 | A1 | 5/2009 | Kelly et al. | 463/31 |
| 2009/0118006 | A1 | 5/2009 | Kelly et al. | 463/31 |
| 2009/0124376 | A1 | 5/2009 | Kelly et al. | 463/29 |
| 2009/0124392 | A1 | 5/2009 | Ruppert et al. | 463/42 |
| 2009/0124394 | A1 | 5/2009 | Swarna | 463/43 |
| 2009/0125603 | A1 | 5/2009 | Atashband et al. | 709/207 |
| 2009/0131144 | A1 | 5/2009 | Allen | 463/20 |
| 2009/0131163 | A1 | 5/2009 | Arbogast et al. | 463/29 |
| 2009/0132720 | A1 | 5/2009 | Ruppert et al. | 709/231 |
| 2009/0170594 | A1 | 7/2009 | Delaney et al. | 463/25 |
| 2009/0181776 | A1 | 7/2009 | Deng | 463/42 |
| 2009/0239667 | A1* | 9/2009 | Rowe et al. | 463/42 |
| 2009/0270170 | A1 | 10/2009 | Patton | 463/36 |
| 2009/0275394 | A1 | 11/2009 | Young et al. | 463/25 |
| 2009/0275400 | A1 | 11/2009 | Rehm et al. | 463/27 |
| 2009/0275401 | A1 | 11/2009 | Allen et al. | 463/29 |
| 2009/0275402 | A1 | 11/2009 | Backover et al. | 463/29 |
| 2009/0276341 | A1 | 11/2009 | McMahan et al. | 705/30 |
| 2009/0298583 | A1 | 12/2009 | Jones | 463/29 |
| 2009/0307069 | A1 | 12/2009 | Meyerhofer | 705/14.12 |
| 2010/0016067 | A1 | 1/2010 | White et al. | 463/25 |
| 2010/0016068 | A1 | 1/2010 | White et al. | 463/25 |
| 2010/0093441 | A1 | 4/2010 | Rajaraman et al. | 463/42 |
| 2010/0124990 | A1 | 5/2010 | Crowder | 463/42 |
| 2010/0125851 | A1 | 5/2010 | Singh et al. | 718/104 |
| 2010/0131772 | A1 | 5/2010 | Atashband et al. | 713/189 |
| 2010/0234104 | A1 | 9/2010 | Ruppert et al. | 463/30 |

FOREIGN PATENT DOCUMENTS

| | | | |
|---|---|---|---|
| DE | 19748930 | A1 | 5/1998 |
| DE | 19940954 | A1 | 3/2001 |
| EP | 0327069 | A2 | 8/1989 |
| EP | 0790848 | B1 | 8/1997 |
| EP | 1074955 | A2 | 2/2001 |
| EP | 1291045 | A2 | 3/2003 |
| EP | 1463008 | A2 | 9/2004 |
| FR | 2775196 | A1 | 8/1999 |
| GB | 2380143 | A | 4/2003 |
| GB | 2382034 | A | 5/2003 |
| JP | 8255059 | | 10/1996 |
| KR | 2001-0084838 | | 9/2001 |
| KR | 2002-0061793 | | 7/2002 |
| KR | 2003-0091635 | | 12/2003 |
| WO | 96/03188 | A1 | 2/1996 |
| WO | 96/36253 | A1 | 11/1996 |
| WO | 97/13227 | A1 | 4/1997 |
| WO | 00/22585 | A2 | 4/2000 |
| WO | 02/05914 | A1 | 1/2002 |
| WO | 03/060846 | A2 | 7/2003 |
| WO | 2005/035084 | | 4/2005 |
| WO | 2007/033207 | A2 | 3/2007 |

OTHER PUBLICATIONS

Bally TMS, "MP21—Automated Table Tracking/Features," 2 pages, Nov. 2005.

Bally TMS, "MPBacc—Specifications/Specifications," 2 pages, Nov. 2005.

Bally TMS, "MPLite—Table Management System/Features," 2 pages, Nov. 2005.

Bravo Gaming Systems, "Casino Table Wager Analysis and Player Tracking System—Table Operations/Unique Features," accessed Apr. 11, 2005, URL=http://www.genesisgaming.com, 4 pages.

Bulavsky, J., "Tracking the Tables," *Casino Journal*, May 2004, pp. 44-47, accessed Dec. 21, 2005, URL=http://www.ascendgaming.com/cj/vendors_manufacturers_table/Trackin916200411141AM.htm, 5 pages.

Burke, A., "Tracking the Tables," reprinted from *International Gaming & Wagering Business*, Aug. 2003, 4 pages.

Casino Software & Services, LLC., accessed Aug. 25, 2006, URL=http:/casinosoftware.com/home.html, 6 pages.

*Gambling Magazine*, "Gaming Company Takes RFID to the Casino," Dec. 27, 2004, accessed Aug. 25, 2006, URL=http:/www.gamblingmagazine.com/managearticle.asp?C=290&A=13186, 4 pages.
Gros, R., "All You Ever Wanted to Know About Table Games," reprinted from *Global Gaming Business*, Aug. 1, 2003, 2 pages.
Hewlett Packard Handhelds, accessed Sep. 8, 2003, URL=http:/www.shopping.hp.com/cgi-bin/hpdirect/shopping/scripts/home/store_access.jsp?temp..., 2 pages.
International Guild of Hospitality & Restaurant Managers, "Shuffle Master, Inc. (NasdaqNM:SHFL)," accessed Dec. 30, 2003, URL=http://hospitalityguide.com/Financial/Casinos/Shuffle.htm, 3 pages.
MagTek, "Port Powered Swipe Reader," Technical Reference Manual, Manual Part No. 99875094 Rev 12, Jun. 2003, 20 pages.
Mikohn, "Mikohn Tablelink—The Industry's Premier Table Tracking Solution Delivers Improvements Straight to the Bottom Line," 2 pages, before Jan. 1, 2004.
Mikohn, "Tablelink™, The New Standard in Table Games," before Jan. 1, 2004, 14 pages.
Palermo, V. "Near-field magnetic comms emerges," EE Times Design, Oct. 31, 2003.
Pro, L.V., "Book Review—The Card Counter's Guide to Casino Surveillance," *Blackjack Insider Newsletter*, May 2003, #40, accessed Aug. 25, 2006, URL=http:/bjinsider.com/newsletter_40_surveillance.shtml, 5 pages.
Rajaraman, U.S. Appl. No. 12/548,289, filed Aug. 26, 2009, 82 pages.
Semtek PDA & Handheld Devices, Compaq iSwipe™ Magnetic Card Reader, accessed Sep. 8, 2003, URL=http:/www.semtek.com/products/iswipe.html, 3 pages.
Shuffle Master, Inc., "Shuffle Master Announces New Products; Intelligent Table System to Be Debuted at G2E," Sep. 10, 2003, 2 pages.
Shuffle Master, Inc., "Shuffle Master Gaming Presents The Ultimate Player Rating System . . . Bloodhound Sniffs Out the Pros and Cons," Dec. 31, 1997, 6 pages.
Snyder, A., "The High-Tech Eye," excerpt from *Blackjack Forum*, Spring 1997, accessed Dec. 21, 2005, from Casino Software & Services, LLC, URL=http://www.casinosoftware.com/bj_forum.html.
Terdiman, D., "Who's Holding the Aces Now?", reprinted from *Wired News*, Aug. 18, 2003, 2 pages.
Ward, K., "BJ Tracking System has Players Down for the Count," *Gaming Today*, Mar. 5, 2002, accessed Dec. 21, 2005, from Casino Software & Services, LLC, URL=http://www.casinosoftware.com/gaming_today.html.
Winkler, C., "Product Spotlight: MindPlay," reprinted from *Gaming and Leisure Technology*, Fall 2003, 2 pages.
US 6,599,191, 07/2003, Breeding et al. (withdrawn)

* cited by examiner

NETWORKED GAMING SYSTEM INCLUDING A LIVE FLOOR VIEW MODULE

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Technical Field

This disclosure generally relates to gaming systems. More particularly, the present disclosure relates to networked gaming systems and methods with real-time monitoring of floor play in a gaming environment.

2. Description of the Related Art

Various gaming systems have included data collection and some forms of utilization to provide graphic displays of the gaming floor on a casino operator display.

There continues to be a need for further improvement in gaming business intelligence systems and methods to gather and utilize gaming operations data.

SUMMARY OF EXEMPLARY EMBODIMENTS OF THE INVENTION

A networked gaming system is provided that includes an Enterprise Environment module. The Enterprise Environment module includes a user interface for displaying gaming floors, playing activity, player interface, and related information collected by the gaming network and a host computer.

A gaming system may be summarized as including a plurality of gaming machines disposed about a gaming floor, each one of the plurality of gaming machines configured to provide respective activity data; a network having the plurality of gaming machines communicatively coupled thereto; a user control station communicatively coupled to the plurality of gaming machines through the network, the user control station including, at least one display device, at least one processor, and at least one processor readable storage medium that stores instructions that cause the at least one processor to process gaming related information, by: displaying a respective multi-dimensional graphical representation of at least a first portion of the gaming floor; displaying a first number of multi-dimensional graphical representations of gaming machines that correspond to an equal first number of gaming machines of the plurality of gaming machines in an arrangement matching an arrangement of the corresponding first number of gaming machines, each one of first number of gaming machines being arranged within an outer periphery that defines the at least first portion of the gaming floor; and displaying at least one multi-dimensional graphical representation of a respective gaming machine of the first number of multi-dimensional graphical representations of gaming machines with a first visual indicator.

The at least one processor readable storage medium may store instructions that cause the at least one processor to process gaming related information, further by: wherein displaying a respective multi-dimensional graphical representation of at least a first portion of the gaming floor and displaying a first number of multi-dimensional graphical representations of gaming machines may further include displaying the least at first portion of the gaming floor and the first number of multi-dimensional graphical representations of gaming machines in a first three-dimensional isometric/perspective graphical representation that is based at least on a first reference view-point, the first reference view-point being an isometric/perspective view-point. The at least one processor readable storage medium may store instructions that cause the at least one processor to process gaming related information, further by: receiving user input indicative of a selection of a second reference view-point, wherein the second reference view-point corresponds to at least one of the following: the second reference view-point being closer to the at least first portion of the gaming floor than the first reference view-point; the second reference view-point being farther from the at least first portion of the gaming floor than the first reference view-point; or the second reference view-point and the first reference view-point being rotationally offset about at least one axis; displaying a second three-dimensional isometric/perspective graphical representation of at least a second portion of the gaming floor and of a second number multi-dimensional graphical representations of gaming machines that correspond to an equal second number of gaming machines of the plurality of gaming machines arranged within an outer periphery of the second portion of the gaming floor based at least on the second reference view-point. The at least one processor readable storage medium may store instructions that cause the at least one processor to process gaming related information, further by: providing a user dimensional-view selector that is indicative of one of a three-dimensional isometric/perspective view-point or a two-dimensional plan view-point, and receiving user input indicative of a selection of one of the isometric/perspective view-point or the plan view-point from the user dimensional-view selector.

The at least one processor readable storage medium may store instructions that cause the at least one processor to process gaming related information, further by: wherein displaying a respective multi-dimensional graphical representation of at least a first portion of the gaming floor and displaying a first number of multi-dimensional graphical representations of gaming machines may further include displaying the at least first portion of the gaming floor and the first number of multi-dimensional graphical representations of gaming machines in a first three-dimensional plan graphical representation that is based at least on a first reference view-point, the first reference view-point being a two-dimensional plan view-point. The at least one processor readable storage medium may store instructions that cause the at least one processor to process gaming related information, further by: receiving user input indicative of a selection of a second reference view-point, wherein the second reference view-point corresponds to at least one of the following: the second reference view-point being closer to the at least first portion of the gaming floor than the first reference view-point; the second reference view-point being farther from the at least first portion of the gaming floor than the first reference view-point; or the second reference view-point and the first reference view-point being rotationally offset about at least one axis; displaying a second two-dimensional plan graphical representation of at least a second portion of the gaming floor and of a second number multi-dimensional graphical representations of gaming machines that correspond to an equal second number of gaming machines of the plurality of gaming machines arranged within an outer periphery of the second portion of the gaming floor based at least on the second reference view-point. The at least one processor readable storage medium may store instructions that cause the at least one processor to process gaming related information, further by: providing a user dimensional-view selector that is indicative of one of a three dimensional isometric/perspective view-point or a two dimensional plan view-point; and receiving user input indicative of a selection of one of the isometric/perspective view-point or the plan view-point from the user dimensional-view selector.

The at least one processor readable storage medium may store instructions that cause the at least one processor to process gaming related information, further by: receiving user input indicative of selection of at least two of the gaming machines of the plurality of gaming machines, and wherein displaying at least one multi-dimensional graphical representation of a respective gaming machine of the first number of multi-dimensional graphical representations of gaming machines with a first visual indicator may further include displaying at least two multi-dimensional graphical representations of gaming machines that correspond to the at least two selected gaming machines with the first visual indicator based at least on the received user input. The at least one processor readable storage medium may store instructions that cause the at least one processor to process gaming related information, further by: wherein displaying at least two multi-dimensional graphical representations of gaming machines that correspond to the at least two selected gaming machines with the first visual indicator based at least on the received user input further includes displaying each respective multi-dimensional graphical representation of a respective gaming machine with a respective second visual indicator that is different from the first visual indicator for each one of the first number of multi-dimensional graphical representations of gaming machines that does not correspond to a respective one of the at least two selected gaming machines. The first visual indicator may be a first color and the respective second visual indicator may be a second color that is different from the first color for each one of the first number of multi-dimensional graphical representations of gaming machines that does not correspond to a respective one of the at least two selected gaming machines.

The at least one processor readable storage medium may store instructions that cause the at least one processor to process gaming related information, further by: for each gaming machine of the plurality of gaming machines, receiving respective game play data from a respective gaming machine; for each respective gaming machine of the plurality of gaming machines, calculating a respective value for a respective measure quantity based at least on the respective game play from the respective gaming machine; determining a respective maximum value and a respective minimum value of a measured quantity based at least on the game play data from the respective gaming machines; and estimating a respective total range of values for the measured quantity based at least on the respective maximum value and the respective minimum value; varying the respective total range of values by at least one change of the respective maximum value and the respective minimum value; and logically associating the first visual indicator with a respective gaming machine of the plurality of gaming machines based at least on the respective total range of values and the respective calculated value of the respective gaming machine. The at least one processor readable storage medium may store instructions that cause the at least one processor to process gaming related information, further by: determining whether the respective value of the calculated quantity is at least equal to a threshold value for each respective gaming machine of the plurality of gaming machines, and wherein logically associating the first visual indicator with a respective gaming machine of the plurality of gaming machines based at least on the respective total range of values and the respective calculated value of the respective gaming machine further includes logically associating the first visual indicator with a respective gaming machine of the plurality of gaming machines only if the respective value of the calculated quantity for respective gaming machine is at least equal to the threshold value. The at least one processor readable storage medium may store instructions that cause the at least one processor to process gaming related information, further by: for each of the at least one multi-dimensional graphical representation of a respective gaming machine, logically associating a respective gaming machine of the plurality of gaming machines with a respective range of values of a plurality of ranges of values based at least on the respective value of the calculated quantity for the respective gaming machine being within the associated range of values, and wherein logically associating the first visual indicator with a respective gaming machine of the plurality of gaming machines further includes, wherein the first visual indicator is one of a plurality of visual indicators, logically associating each respective range of values with a respective visual indicator of the plurality of visual indicators, and wherein each range of values has a respective visual indicator associated therewith that is different from all other visual indicators of the plurality of visual indicators. The plurality of visual indicators may be colors in accordance with a graduated color scheme extending between a first color and a second color associated, wherein the plurality of ranges of values consists of a number of ranges ordered from a lowest range of values associated with the first color to a highest range of values associated with the second color, from the lowest range of values to the highest range of values, each respective range of values being associated a respective visual indicator in accordance with the graduated color scheme.

A method of displaying gaming activity to a user of a control station communicatively coupled to a plurality of physical gaming machines disposed about a gaming floor may be summarized as including calculating a range of values (R) corresponding to wagering activity at the plurality of physical gaming machines with a processor of a computing device, the range of values defined by a minimum range value and a maximum range value; calculating a value of a divisor (D) by which to divide the range of values with at least one processor of a computing device, where the divisor (D) is greater than one (1); calculating a quotient and a remainder from division of the range of values (R) by the divisor (D) with the at least one processor of the computing device; color coding a respective first icon of an approximately D number of first icons with a respective color of an approximately D number of colors of a graduated color scale, each respective first icon corresponding to a respective subrange of an approximately D number of subranges of the range of values, wherein the approximately D number of subranges are ordered from a lowest subrange to a highest subrange, and wherein the approximately D number of first icons are color coded in accordance with the order of the subranges and the graduated color scheme; and displaying a first number of first icons on a display device of the control station.

The method of displaying gaming activity to a user of a control station communicatively coupled to a plurality of physical gaming machines disposed about a gaming floor may further include calculating the graduated color scale starting at the first color and ending at the second color; and defining a number (N) of subranges of the range of values (R) to approximately span the range of values (R), the respective subranges being of approximately equal size and approximately equal to the quotient, and where the number (N) is approximately equal to the value of D. Calculating a range of values (R) corresponding to wagering activity at the plurality of gaming machines may further include receiving respective game play data corresponding to wagering activity for respective gaming machine of the plurality of gaming machines; determining a respective maximum value and a respective minimum value of a measured quantity based at least on the respective game play data; and estimating the range of values as a difference between the respective maximum value and the respective minimum value of the measured quantity.

The method of displaying gaming activity to a user of a control station communicatively coupled to a plurality of physical gaming machines disposed about a gaming floor may further include determining whether the remainder is above a threshold value; and only if the remainder is above the threshold value, adjusting at least one of the minimum range of values, the maximum range of values and the value of the divisor (D), and repeating the calculating a range of values (R) and the calculating a quotient and a remainder based at least on the at least one adjusted minimum range of values, the maximum range of values and the value of the divisor (D). The method of displaying gaming activity to a user of a control station communicatively coupled to a plurality of physical gaming machines disposed about a gaming floor may further include repeatedly adjusting at least one of the minimum range of values, the maximum range of values and the value of the divisor (D) and calculating the range of values (R) and the calculate the quotient and the remainder until the remainder is at least equal to the threshold value.

The method of displaying gaming activity to a user of a control station communicatively coupled to a plurality of physical gaming machines disposed about a gaming floor may further include adjusting the minimum range value and the maximum range value to have respective integer values. The method of displaying gaming activity to a user of a control station communicatively coupled to a plurality of physical gaming machines disposed about a gaming floor may further include adjusting the divisor to have an integer value.

The method of displaying gaming activity to a user of a control station communicatively coupled to a plurality of physical gaming machines disposed about a gaming floor may further include calculating a respective measured quantity for at least one respective gaming machine of the plurality of gaming machines based at least on respective game play data indicative of wagering activity for the respective gaming machine, wherein each respective measured quantity has a respective value included in a respective one of the subranges; for each respective gaming machine of the at least one respective gaming machine, color coding a respective second icon with a respective color of the number of colors based at least on the respective subrange that includes the respective measured quantity for the respective gaming machine and the graduated color scheme, wherein the respective second icon is color coded in accordance with the order of the subranges and the graduated color scheme; and displaying the at least one second icon on the display device. Displaying the at least one second icon may further include displaying a multi-dimensional graphical representation of at least a portion of the gaming floor, the portion of the gaming floor being defined by an outer peripheral boundary, each respective gaming machine of the at least one gaming machine located at a respective position within the outer peripheral boundary that defines the portion of the gaming floor; and displaying a respective multi-dimensional graphical representation of a respective gaming machine for each at least one second icon.

In one or more alternative embodiments, a business intelligence system and method includes determining a score associated with play on a gaming machine, panel, or portion on the floor.

Other features and numerous advantages of the various embodiments will become apparent from the following detailed description when viewed in conjunction with the corresponding drawings.

DETAILED DESCRIPTION OF THE PREFERRED EMBODIMENTS

Figure 1A:
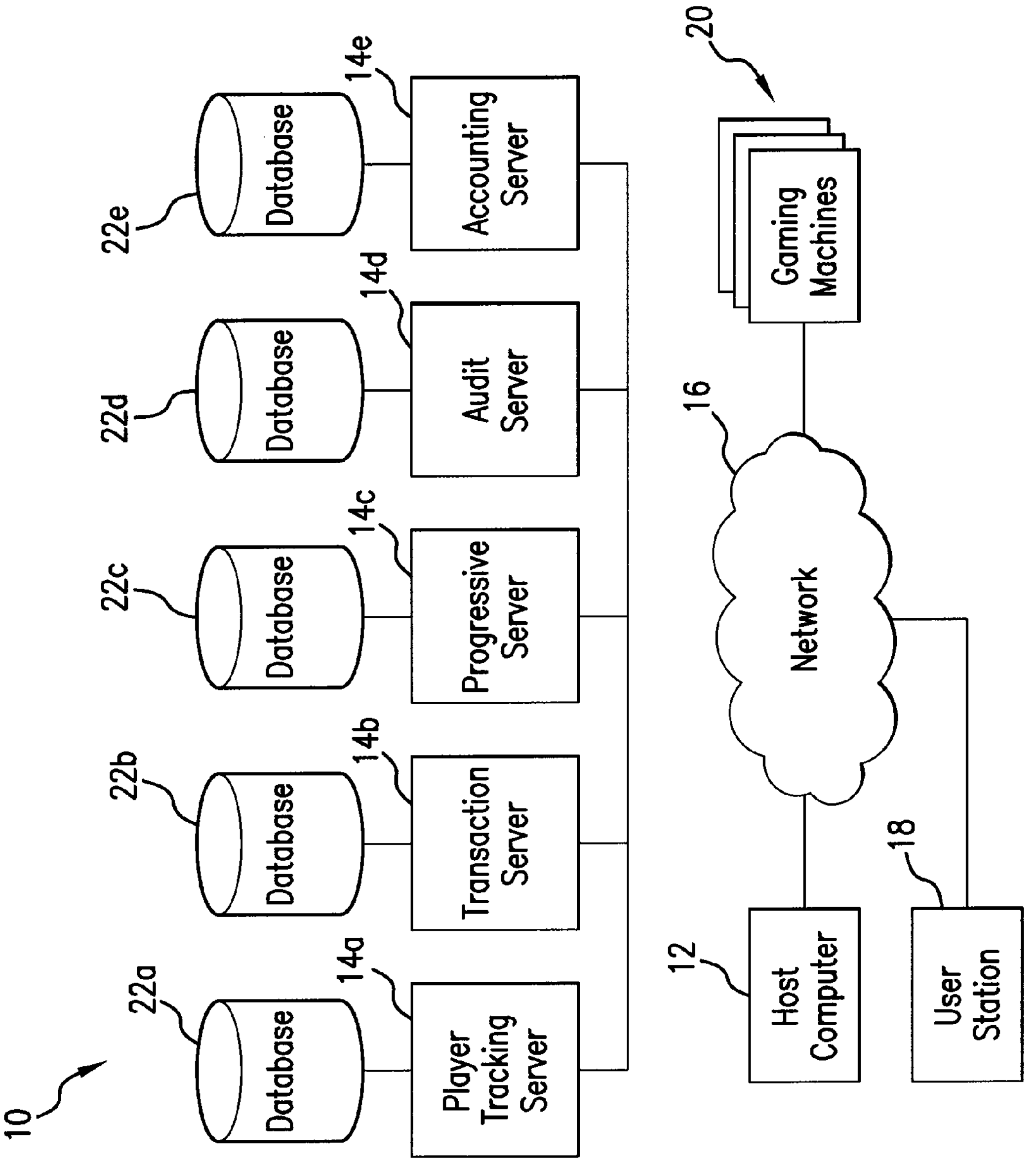
FIG. 1A is a block diagram of a networked gaming system, according to one illustrated embodiment.

Persons of ordinary skill in the art will realize that the following disclosure is illustrative only and not in any way limiting. Other embodiments will readily suggest themselves to such skilled persons having the benefit of this disclosure.

Example networked gaming systems as contemplated herein are more fully described in U.S. patent application Ser. No. 12/269,712, filed 12 Nov. 8, U.S. Provisional Patent Application 61/115,513, filed 17 Nov. 8, and U.S. Provisional Patent Application 61/115,690, filed 18 Nov. 8 are hereby incorporated by reference for all purposes.

Some Definitions, Acronyms, and Abbreviations utilized herein include:

BCFx: Client Framework (such as a commercially available Bally Client Framework as modified herein);

Modular Design: The application is composed of loosely coupled parts which allows for the modular construction of the application;

Module: Business logic is logically separated into modules or plug-ins based on the business logic that is implemented. modules can be developed independently by independent teams;

Service: A supporting class that provides programmatic functionality to other objects in a loosely coupled fashion—it often contains utility methods that are not tied to a specific WorkItem;

Shell: The Application Shell is a container that hosts user facing functionality (SmartParts) provided by one or more module(s);

SmartPart: A visual presentation, a view, of the data owned by a WorkItem; WorkItem: A runtime container of the objects and services used by a discrete part of the Bally Desktop—a WorkItem can be thought of as a logical sub-process—a WorkItem often contains business logic.

Referring to the drawings, for illustrative purposes, it will be appreciated that the apparatuses and systems may vary as to configuration, function, and as to details of the parts, and that the methods and processes may vary as to details, partitioning, and the order of the acts, without departing from the inventive concepts disclosed herein.

Referring to FIG. 1A, a block diagram of a networked gaming system 10 is shown in accordance with one non-limiting embodiment. The networked gaming system 10 includes a host computer 12, special purpose servers (collectively referenced as 14 and individually referenced as 14*a*-14*e*) connected to the host computer 12 through a network 16, a user station 18 (such as a commercially available Bally control panel or workstation or Bally Desktop computer station modified in accordance with the description herein), and number of gaming machines 20 connected to the network 16. The gaming machines 20 provide data on a real-time or substantial real-time basis which is routed by the host computer 12 to respective servers, such as a player tracking server 14*a*, a transaction server 14*b*, a progressive server 14*c*, an audit server 14*d*, and/or accounting server 14*e*, each of which includes a respective database (collectively referenced as 22 and individually referenced as 22*a*-22*e*) for storing data. Data is stored in a respective database 22 in accordance with programming of its respective server 14.

Figure 1B:
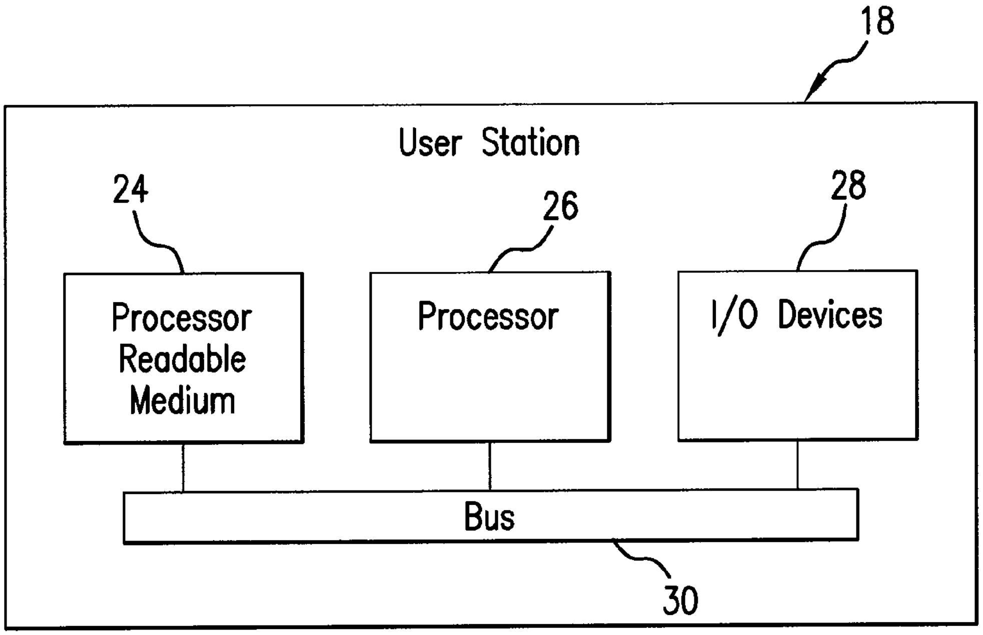
FIG. 1B is a block diagram of a user station, according to one illustrated embodiment.

Referring to FIG. 1B, a block diagram of a user station 18 is shown, according to one illustrated embodiment. The user station 18 may include, among other things, a processor readable medium 24, a processor 26, and input/output (I/O) devices 28, which are connected by a bus 30.

The processor readable medium 24 is communicatively coupled to the processor and may include, among other things, any one or combination of volatile memory elements such as a read-only memory (ROM) and a random access memory (RAM). The random access memory (RAM) may include dynamic random-access memory (DRAM), static random-access memory (SRAM), synchronous dynamic random-access memory (SDRAM), flash RAM, etc.

Figure 1C:
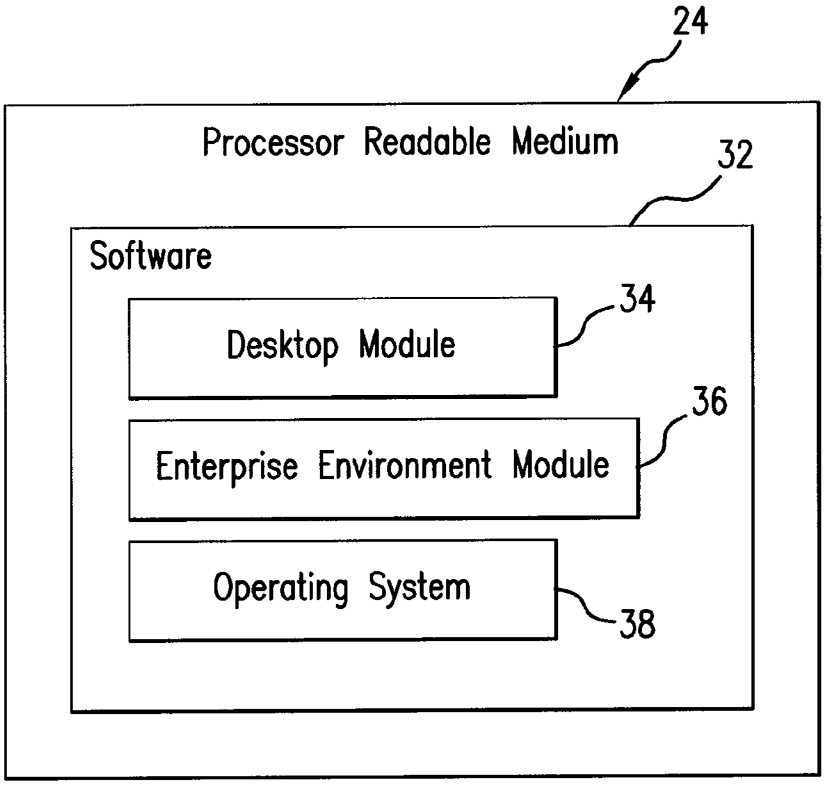
FIG. 1C is a block diagram of a processor readable medium, according to one illustrated embodiment.

Referring to FIG. 1C, the processor readable medium 24 may store one or more logic modules or logic routines, each of which may comprise an ordered listing of executable instructions for implementing logical functions. In particular, the processor readable medium 24 stores an operating system 38 and, among other things, software such as a Desktop Module 34, for example Bally Desktop, with a user interface (UI) and Enterprise Environment module 36. The execution of the operating system 38 by the processor 26 essentially controls the execution of other logic, such as a desktop application software and provides scheduling, input-output control, file and data management, memory management, and communication control and related services.

Referring to FIG. 1B, the processor 26 may be a custom made or commercially available processor, a central processing unit (CPU), a semiconductor based microprocessor (in the form of a microchip or chip set), or generally any device for executing software instructions.

Referring to FIGS. 1B and 1C, the processor 26 executes the software 32. Execution of the Desktop Module 34 with a user interface (UI) enables an operator (or authorized user) to, among other things, monitor casino floor activity, modify gaming machine programming, initiate promotions, and conduct various operations associated with the gaming floor or data gathered by the servers, by selecting various options from programs and menus. By example, the enterprise environment module 36 such as a commercially available Bally Enterprise Environment Module (BEE) is a rich interface capable of displaying information from a diverse range of data providers (such as gaming machines 20) in the networked gaming system 10, such as a Bally Networked Gaming System, in a unified way. This rich interface provides a single point of access for networked gaming system 10 from which the user may perform tasks and receive information in a rapid fashion.

The enterprise environment module 36 may, among other things, enable developers of the Desktop Module 34 to make modifications, add capabilities or features, deliver an improved user experience, and an improve the level of usability by an operator or user. The enterprise environment module 36 enables developers to modify the Desktop Module and to inject their features and functionality into the UI at runtime without any recompiling or changing the original source code. The enterprise environment module 36 may include Enterprise Environment Extensions that enable the customization and partial control of the UI at runtime as determined by a module developer. Module Extensions are comprised of a set of modifiable Enterprise Environment application settings. These settings may be applied at runtime and the Enterprise Environment user interface is modified by them.

Software comprising user-interface application software may include various logic modules or logic routines, each of which may comprise an ordered listing of executable instructions for implementing logical functions. In particular, the user-interface application software may include logic for providing graphical user interfaces.

The I/O devices 28 may include input devices, for example but not limited to, a keyboard, mouse, microphone, touch sensitive display, etc. Furthermore, the I/O devices 28 may also include output devices, for example but not limited to, one or more display devices, speakers etc. The I/O devices 28 may further include communication ports for communicating with the user station 18. I/O devices include IEEE 1394, USB, wireless (Bluetooth, etc.), serial binary data interconnection such as RS232, infrared data association (IrDA), DVD drives, CD drives, etc.

Figure 1D:
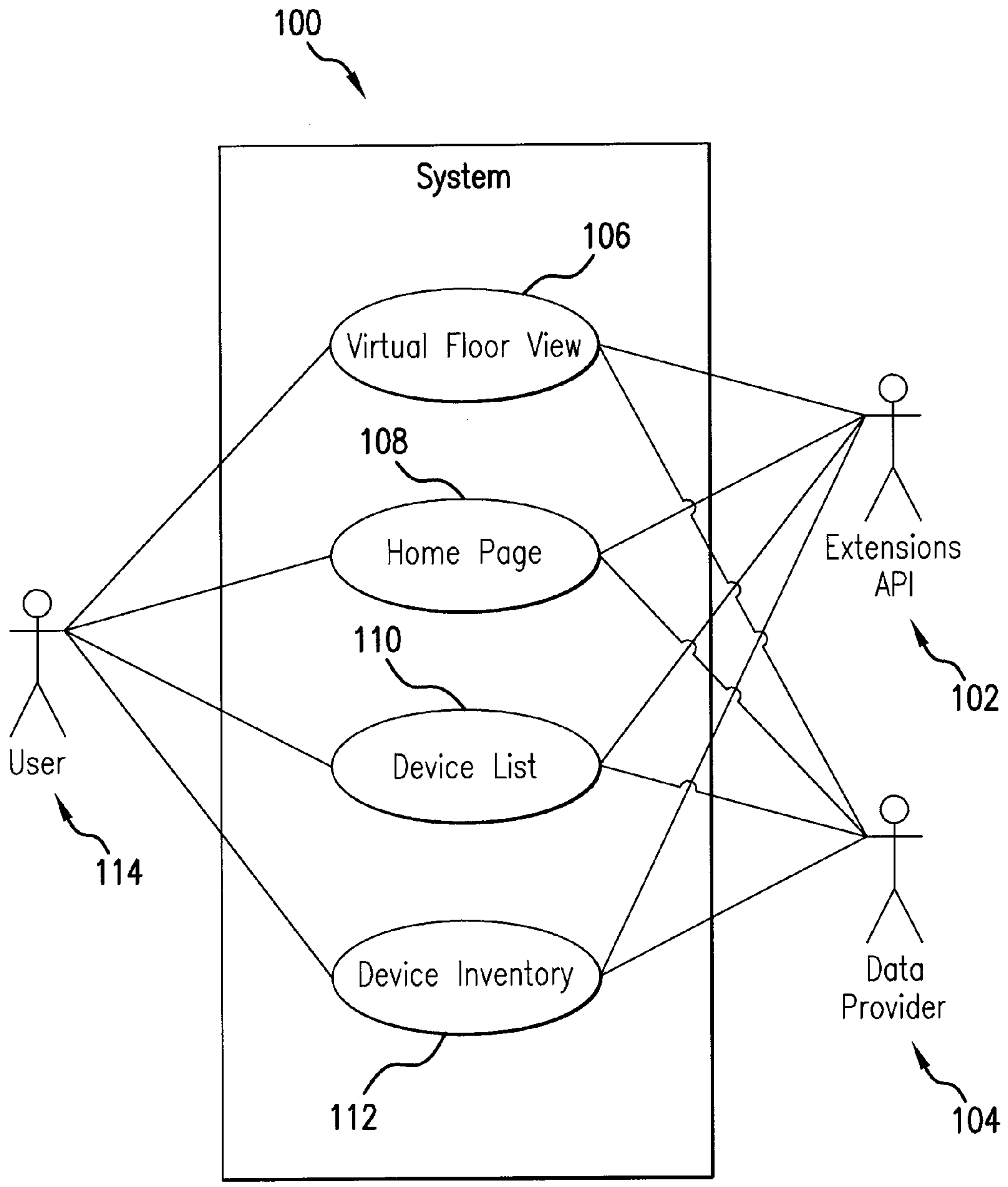
FIG. 1D is a context diagram of a control system for managing a gaming floor, according to one illustrated embodiment.

Referring to FIG. 1D, a context diagram of a control system 100 for managing a gaming floor is shown, according to one illustrated embodiment. The control system 100 may include a workstation (not shown) and/or a host system (not shown). The control system 100 may be used by a User 114, and the control system 100 provides, among other things, a graphical user interface having various windows for, among other things, managing a gaming floor. The control system 100 may include one or more Extension APIs 102 and is communicatively coupled to one or more Data Providers 104 (such as networked gaming machines and/or floor personnel connected through network devices). The Enterprise Environment module may also provide a visual framework and Extension APIs, which enable or provide features and functionality from other modules.

Another aspect of the Desktop Module includes the capability of enhancing the user experience by incorporating the following visual elements: Virtual Floor View 106; Global Site View or Home Page 108; Gaming Device List View 110; and Gaming Device Inventory View 112.

The Enterprise Environment module may provide a UI development platform/framework that provides a consistent look and feel to Client UI screens. Example Architectural Patterns that may be used by the Enterprise Environment module include: 1) A Composite Pattern chosen to enable the manipulation of UI elements from various Networked Gaming Systems in a homogeneous fashion. 2) A Model View Presenter (MVP) Compound Pattern may be used to decouple data, business logic, and views and to promote reusability and flexibility within the Presentation Tier. 3) An Observer Pattern may be used to enable loosely coupled notification architecture. An Abstract Factory Pattern may be used to promote loose coupling and abstraction. A Command Pattern may be used to extend the Bally Enterprise Environment actions to the various Networked Gaming Systems Desktop Modules on respective user workstations. A Proxy Pattern may be used to manage interactions between the Presentation Tier and the Middle Tier (Data Service). Most of these Architectural Patterns may be extended via the Desktop application.

The control system (System), among other things, collects and maintains gaming floor information which may be disseminated and utilized by the User 114 to display the Home Page 108, the Virtual Floor View, the Device List 110, and the Device Inventory 112, and, provide other information, functionality and services.

Figure 2:
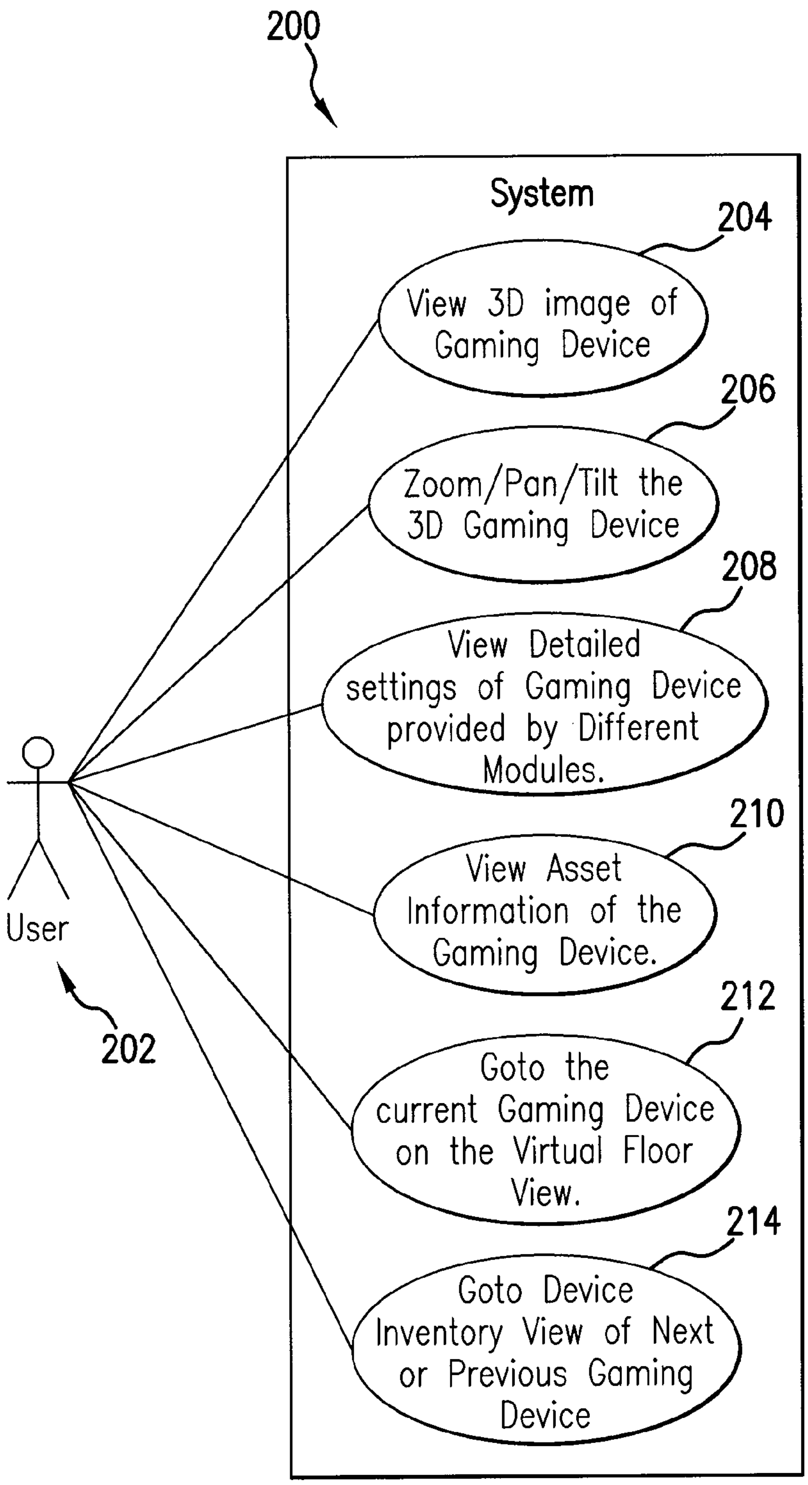
FIG. 2 is a context diagram of a control system for providing gaming floor inventory information, according to one illustrated embodiment.

Referring to FIG. 2, a context diagram of a control system 200 is shown, according to one illustrated embodiment. Among other things, the control system 200 provides gaming device information to a user 202. The control system 200 includes various modules that enable the user-interface application software to, among other things, provide the user with windows from which the user may select and control a view and may display a view in accordance with the user selection. User selectable views provided by the control system include a three-dimensional image view 204, which may be used to provide a three-dimensional image of one or more selected gaming devices; a viewable zoom, pan, or tilt viewed display controller 206 for controlling the three-dimensional view 204; a view detailed settings window 206, which may be used to provide a view of detailed settings of one or more gaming devices which may be provided by other modules; a view asset information window 210, which may be used to provide a view of the asset information of one or more gaming devices; a viewable GoTo controller 212, which may be used to identify a selected gaming device on the virtual floor; and a viewable GoTo device view controller 214, which may be used to go to a device inventory view of a next or a previous gaming device.

Figure 3:
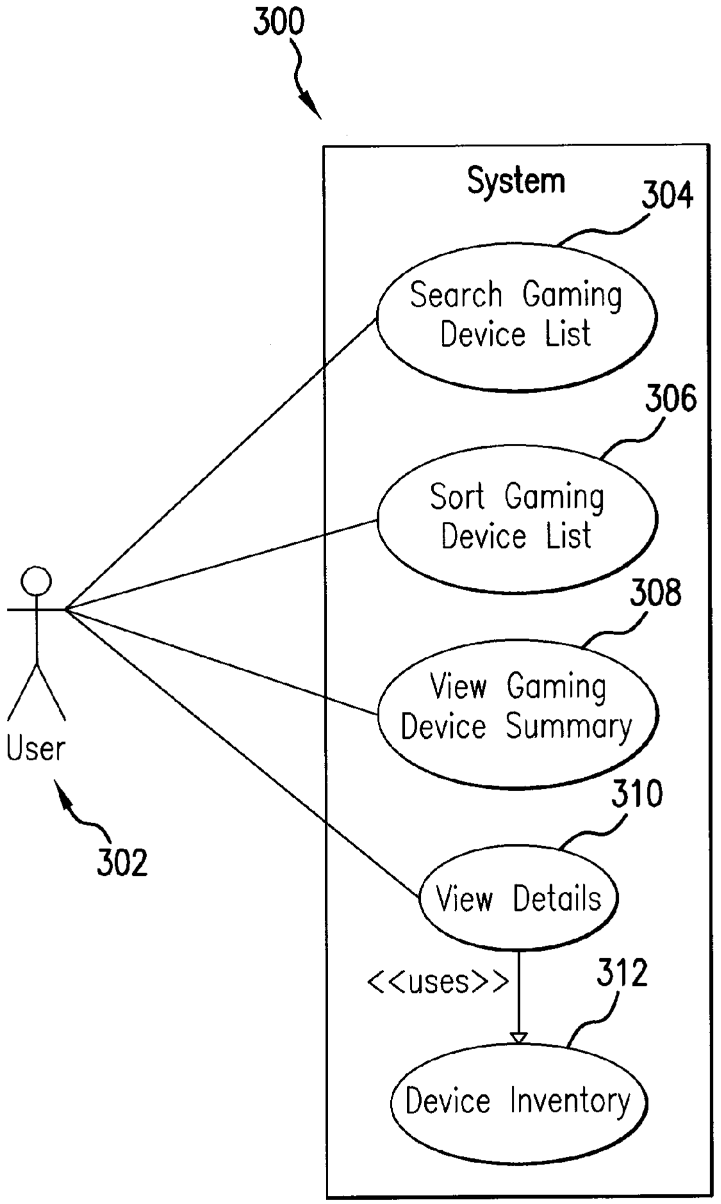
FIG. 3 is a context diagram of a control system for providing gaming device information, according to one illustrated embodiment.

Referring to FIG. 3, a context diagram of a control system 300 for providing gaming device information to a user 302 is shown, according to one illustrated embodiment. The control system 300 implements the user-interface application software to provide a search gaming device list window 304, a sort gaming device list window 306, a view gaming device summary window 308, and a view details window 310 connecting by USB to a device inventory database 312. The user-interface application software includes various modules that enable the user 302 to make user selections in some or all of windows 304-310. The user-interface application software may include various modules that perform various processes for providing the windows 304-310 such as search module, a sort module, etc. In some embodiments, the user-interface application software may include various modules the interface with applications or modules that perform various processes for providing the windows 304-310 such as search module, a sort module, etc.

Figure 4:
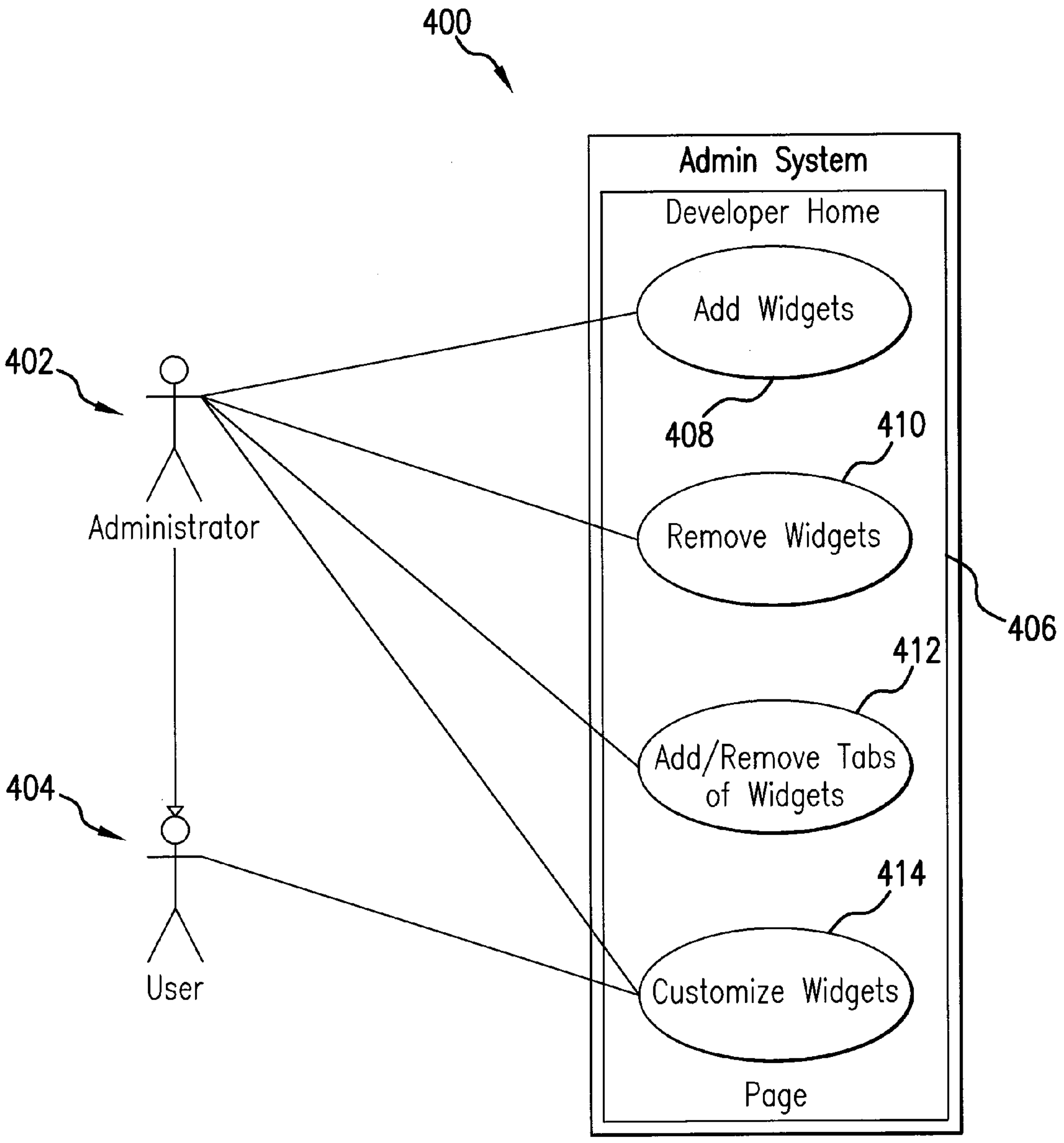
FIG. 4 is a context diagram of an administrative system providing functions and processes to control system, according to one illustrated embodiment.

Referring to FIG. 4, a context diagram of an administrative system 400 is shown, according to one illustrated embodiment. The administrative system 400 is used by an administrator 402 to control or provide processes that a user 404 of a control system (100, 200, 300, see FIGS. 1-3, respectively) may implement/utilize. The administrative system 400 includes a developer home page 406. Among other things, the developer home page 406 provides viewable selectors or windows such as an add widgets window 408, remove widgets window 410, an add/remove tabs of widgets window 412, and a customize widgets window 414, where widgets refer to selectable modules, subroutines, or functions which may be added to the functionality of the user-interface application software such as a Desktop Module.

In some embodiments, the administrator 402 may grant the user 404 access to the customize widgets window 414. The user 404 may be able to access the customize widgets window 414 via the developer home page 406 such that the user 404 may customize existing widgets employed by the user's control system (100, 200, 300, see FIGS. 1-3, respectively). In some embodiments, the user's control system (100, 200, 300, see FIGS. 1-3, respectively) may also have the capability of customizing existing widgets utilized by the user-interface application software such as the Desktop Module.

Figure 5:
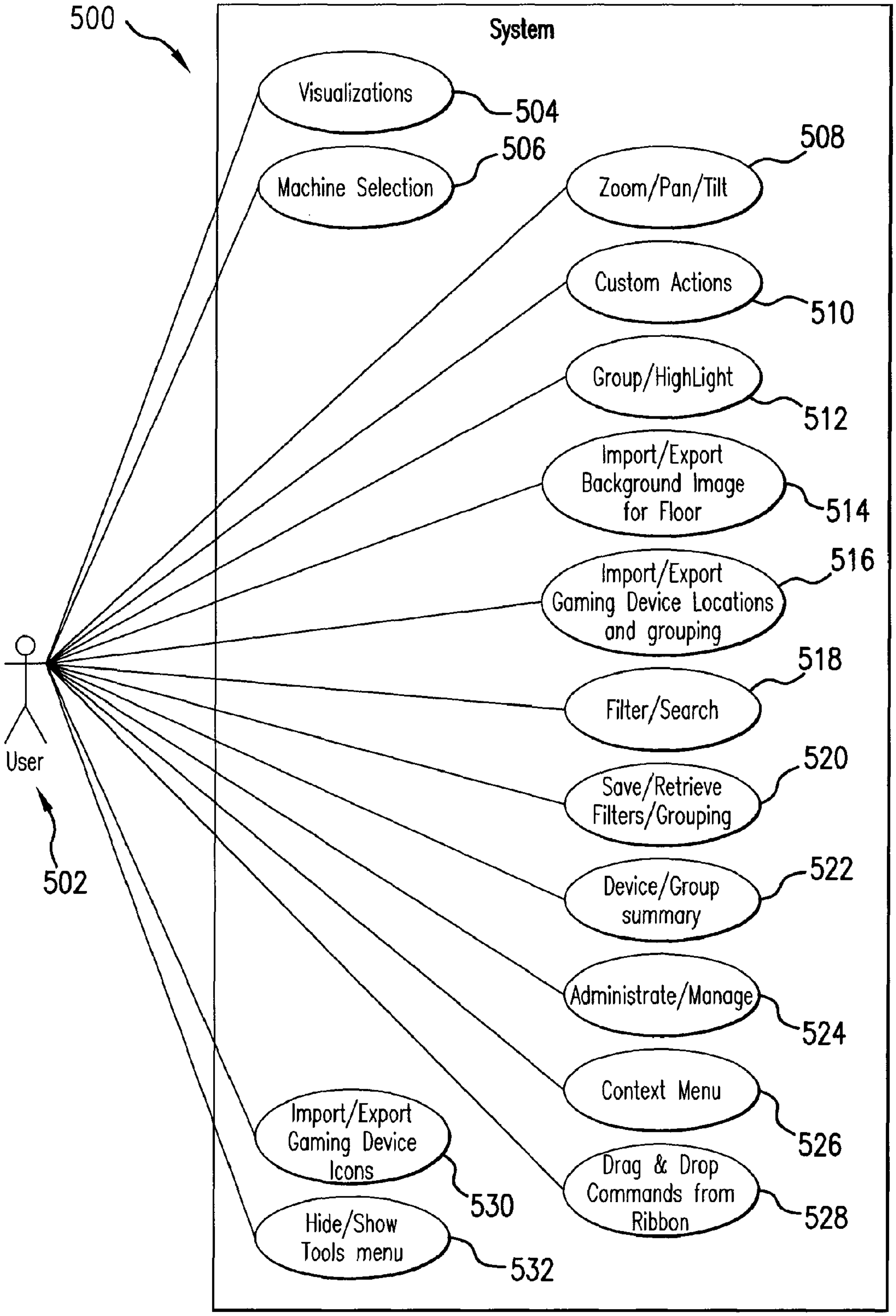
FIG. 5 is a context diagram of functions and processes of a control system, according to one illustrated embodiment.

Referring to FIG. 5, a context diagram of functions and processes of a control system 500 is shown, according to one illustrated embodiment. The control system 500 provides a user with, among other things, virtual floor view information and functions and process by which the user may, among other things, analyze the virtual floor view information, select virtual floor view information for display, and control the manner in which information is displayed. The information and functions and process provided by the control system 500 includes visualizations 504, machine selection 506, zoom/pan/tilt 508, custom actions 510, group/highlight 512, import/export background image for the casino floor image 514, import/export gaming device locations and grouping 516, filter/search 518, save/retrieve filters/grouping 520, device/group summary 522, administrate/manage 524, context menu 526, drag & drop commands from ribbon 528, import/export gaming device icons 530, and hide/show tools menu 532. The aforementioned information and functions and processes may be provided by the user interface application software such as the Desktop Module.

Figure 6:
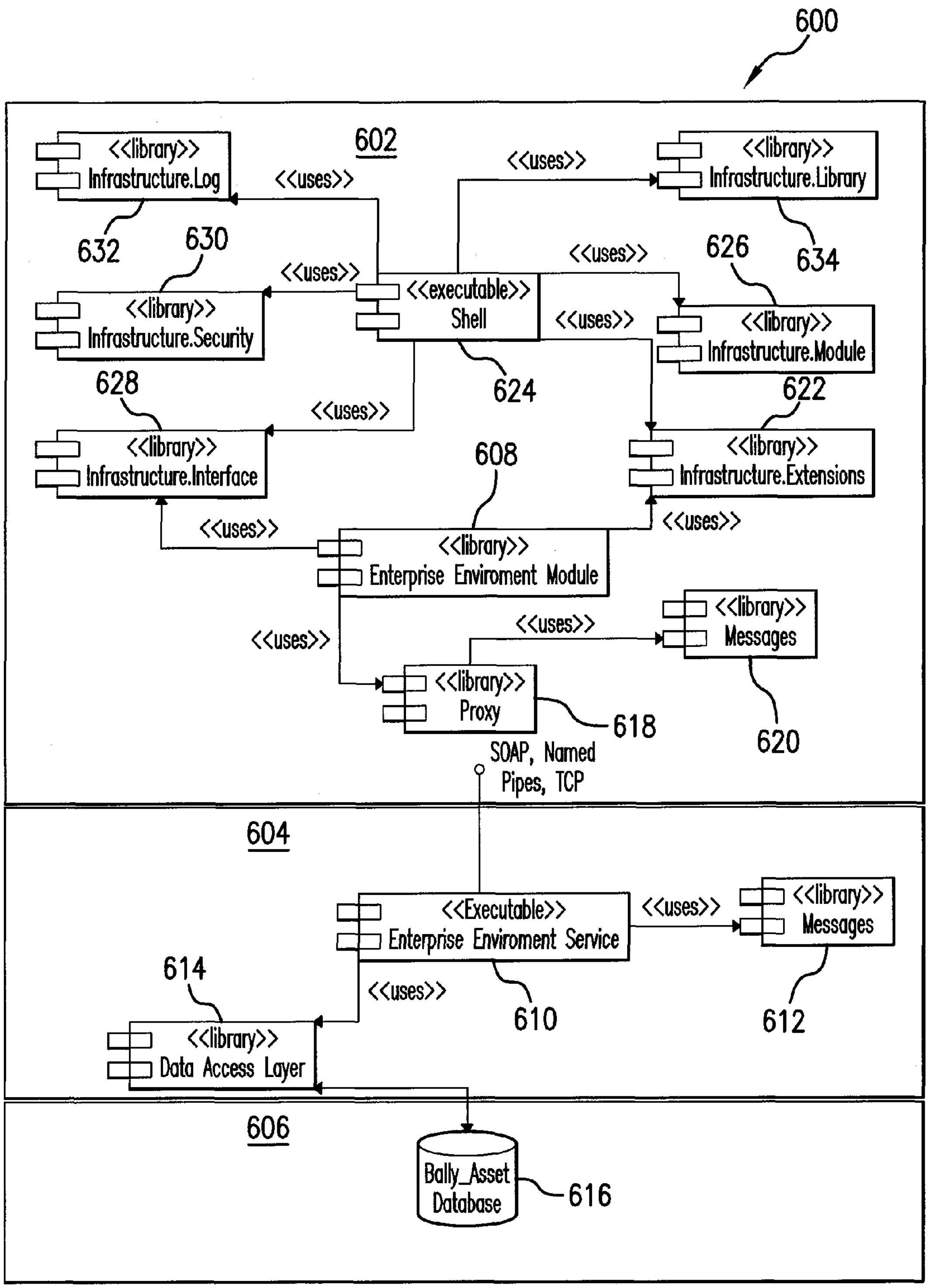
FIG. 6 is a composition diagram of an Enterprise Environment that includes an Enterprise Environment module, an Enterprise Environment Service (EES), and an Asset Database, according to one illustrated embodiment.

FIG. 6 is a composition diagram of an Enterprise Environment 600, according to one illustrated embodiment. The Enterprise Environment 600 includes a presentation tier 602, a middle tier 604 and a data tier 606. The presentation tier 602 is shown as including an Enterprise Environment (EE) module 608 such as, for example, commercially available Bally Enterprise Environment module.

The middle tier 604 is shown as including an Enterprise Environment Service (EES) executable 610, which may be implemented on the host computing system and/or the workstation. The middle tier 604 includes a Messages module/library 612 and a Data Access Layer module 614. The Data Access Layer module 614 provides a connection to a database 616 such as an Asset Database, for example, commercially available Bally Asset Database.

The EES executable 610 and the Enterprise Environment module 608 communicate through conventional modes, such as Soap, Named Pipes, TCP, etc.

The presentation tier 602 includes a Proxy module 618 connecting to a Messages module 620, an Infrastructure Extensions module 622 connecting to a Shell 624 through an Infrastructure module 626. The presentation tier 602 may also include an Infrastructure Interface module 628, an Infrastructure Security module 630, an Infrastructure Log module 632, and an Infrastructure Library module 634 connecting to the Shell 624.

Figure 7:
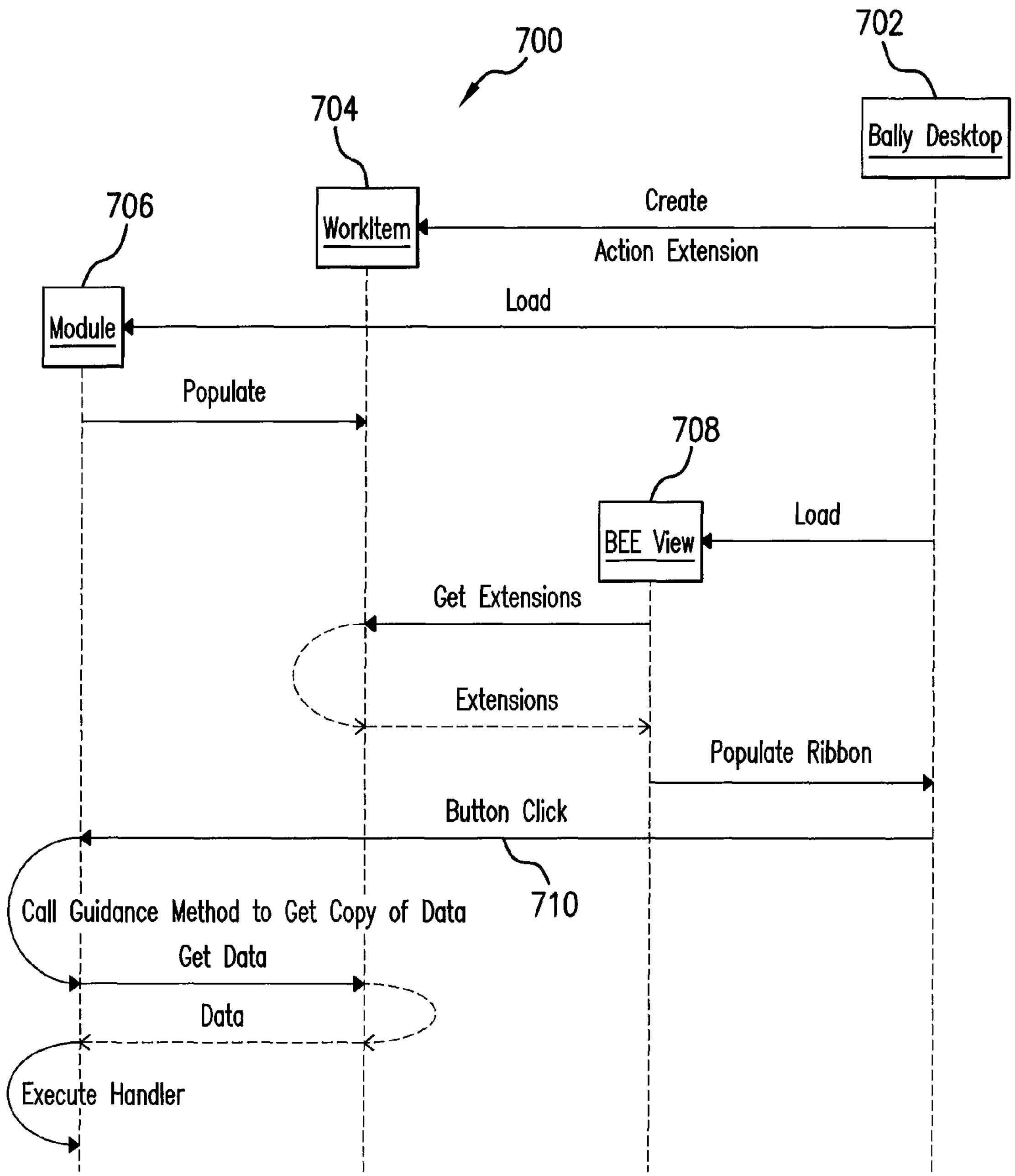
FIG. 7 is a transaction diagram for an Action Discovery process, according to one illustrated embodiment.

Referring to FIG. 7, a transaction diagram for an Action Discovery process 700 is shown, according to one illustrated embodiment. The Action Discovery process 700 may be implemented by a Desktop module 702 at runtime such as, for example, when the user station is booted up and/or when the Desktop module 702 is initiated. First, the Desktop module 702 (such as a commercially available Bally Desktop module modified in accordance with the subject specification as described herein) creates an Action Extension object (not shown) and inserts the Action Extension object into a WorkItem 704 such as a RootWorkItem. The Desktop module 702 loads a module 706, and the WorkItem 704 pushes a list of ActionItems of the WorkItem 704 into the ActionExtension (object/container) using a method provided by the service.

The Desktop module 702 may load a number of other/different modules 706, and the other modules will similarly populate the ActionExtension (object/container). The modules 706 have a respective extension. Typically, the last module to be loaded will be the Enterprise Environment module 708, which will get the ActionExtension (object/container) and go through each module's extension and create and populate a ribbon accordingly. As one non-limiting example, a scheme followed may be: Tab: has the name of the Enterprise Environment module; Group: each module has its own group and action items of the respective module may go inside the respective module's group as buttons. A respective module may write its handlers for its Action Item Declaratively.

When the last loaded module 708 receives a command that a button is clicked 710, the module 708 fetches appropriate data from the WorkItem 704 (e.g., RootWorkItem). If the module 708 tries to fetch the data directly from the WorkItem 704 (e.g., RootWorkItem) (as it is common to the entire UI), the fetched data could be changed by Desktop 702 (e.g., Bally Desktop) at any time. One way to handle this is for the module to call a procedure generated by a guidance package the data is copied and then the copied data is passed to the handler.

Figure 8:
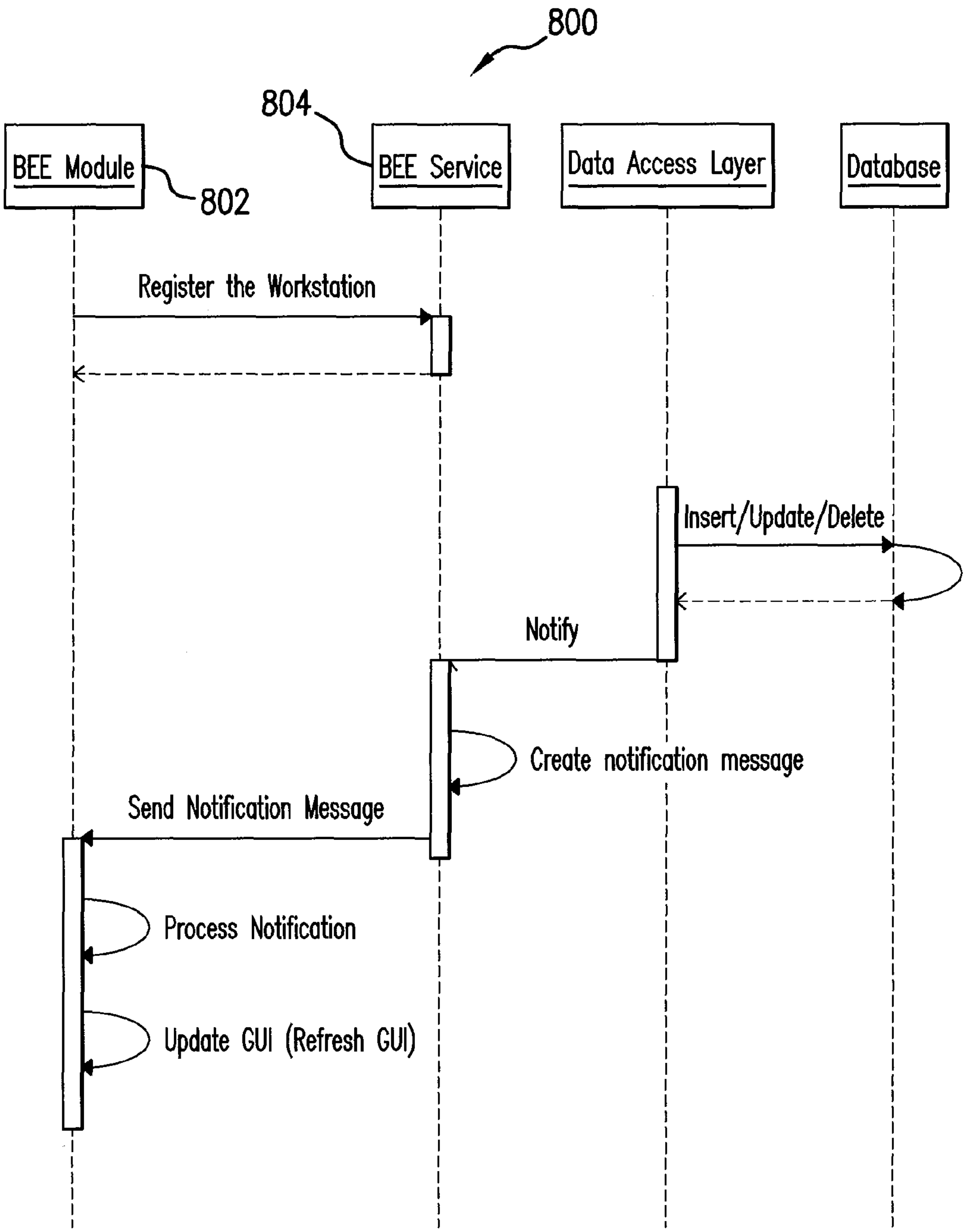
FIG. 8 is a transaction diagram for a notification mechanism and/or process, according to one illustrated embodiment.

Referring to FIG. 8, a flow diagram 800 is shown describing sequences associated with a notification mechanism and/or method. Initially, an Enterprise Environment module 802 needs to register itself to an enterprise environment Service 804. The registration process tells the Enterprise Environment Service 804 to send the notification back only to the registered clients. With this mechanism there is no need to use UDP broadcasting which sends the notification messages to all clients in the network in the unsecure way. A data access layer (DAL) 806 may notify the Enterprise Environment Service 804 in any one of an Insert operation, an Update operation and/or a Delete operation. The Enterprise Environment Service 804 may create an appropriate message based on the operation and may send the appropriate message over http/https to the Enterprise Environment module 802. The Enterprise Environment module 802 may have a callback logic which may be called by the Enterprise Environment service 804 on notification process. An Update process refreshes or updates the appropriate view based on the received message.

Figure 9:
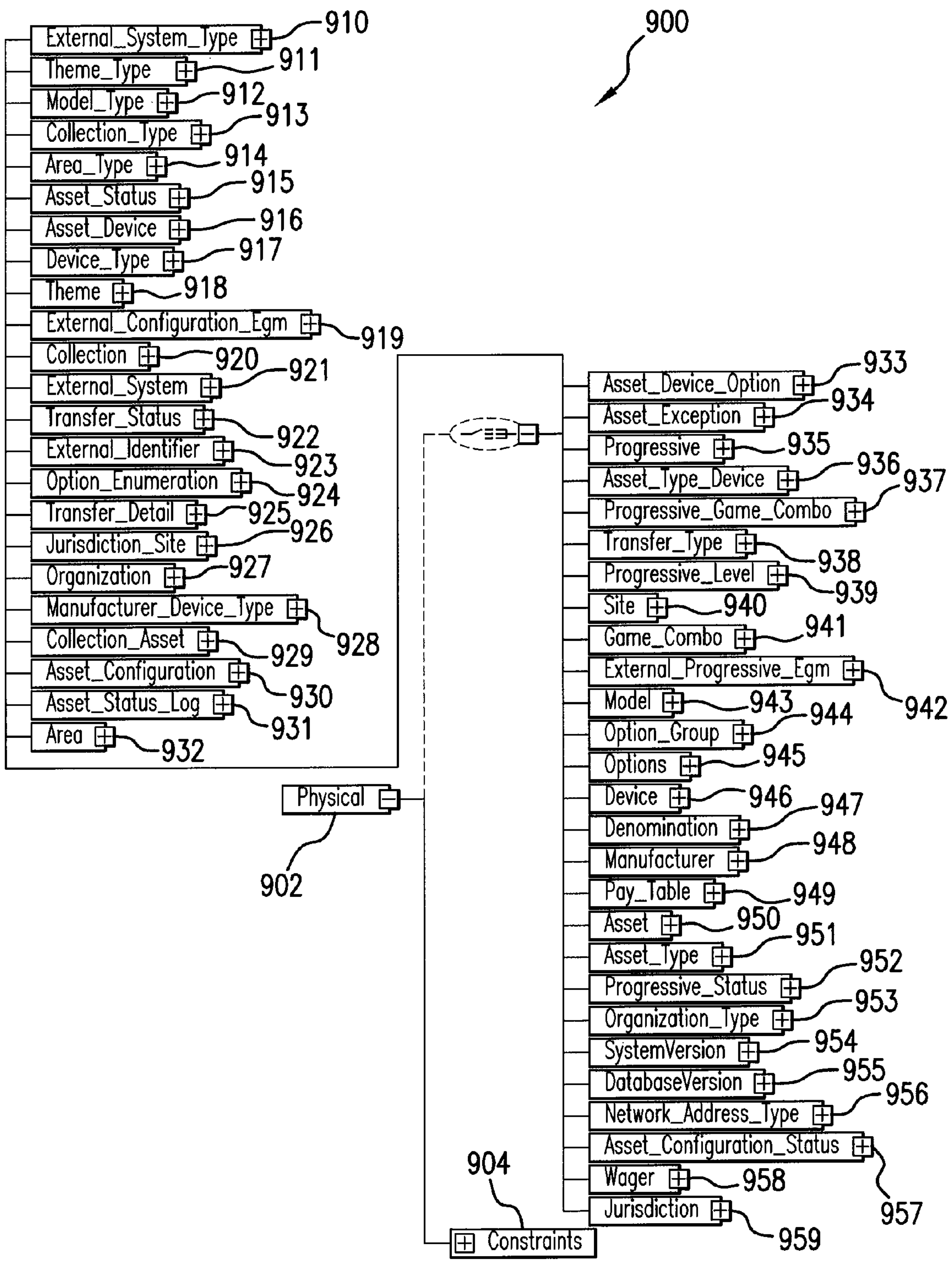
FIG. 9 is a schematic diagram of a database schema, according to one illustrated embodiment.

Referring to FIG. 9, a database schema 900 is shown. The database schema 900 may be employed servers 104 and/or the Enterprise Environment module 126 (see FIG. 1). The data base schema 900 relates physical assets (Physical) 902 to compiled data including Constraints 904, External System Type 910, Theme Type 911, Model Type 912, Collection Type 913, Area Type 914, Asset Status 915, Asset Device 916, Device Type 917, Theme 918, External Configuration Egm 919, Collection 920, External System 921, Transfer Status 922, External Identifier 923, Option Enumeration 924, Transfer Detail 925, Jurisdiction Site 926, Organization 927, Manufacturer Device Type 928, Collection Asset 929, Asset Configuration 930, Asset Status Log 931, Area 932, Asset Device Option 933, Asset Exception 934, Progressive 935, Asset Type Device 936, Progressive Game Combo 937, Transfer Type 938, Progressive Level 939, Site 940, Game Combo 941, External Progressive Egm 942, Model 943, Option Group 944, Options 945, Device 946, Denomination 947, manufacturer 948, Pay Table 949, Asset 950, Asset Type 951, Progressive Status 952, Organization Type 953, System Version 954, Database Version 955, Network Address Type 956, Asset Configuration Status 957, Wager 958, and Jurisdiction 959.

Figure 10:
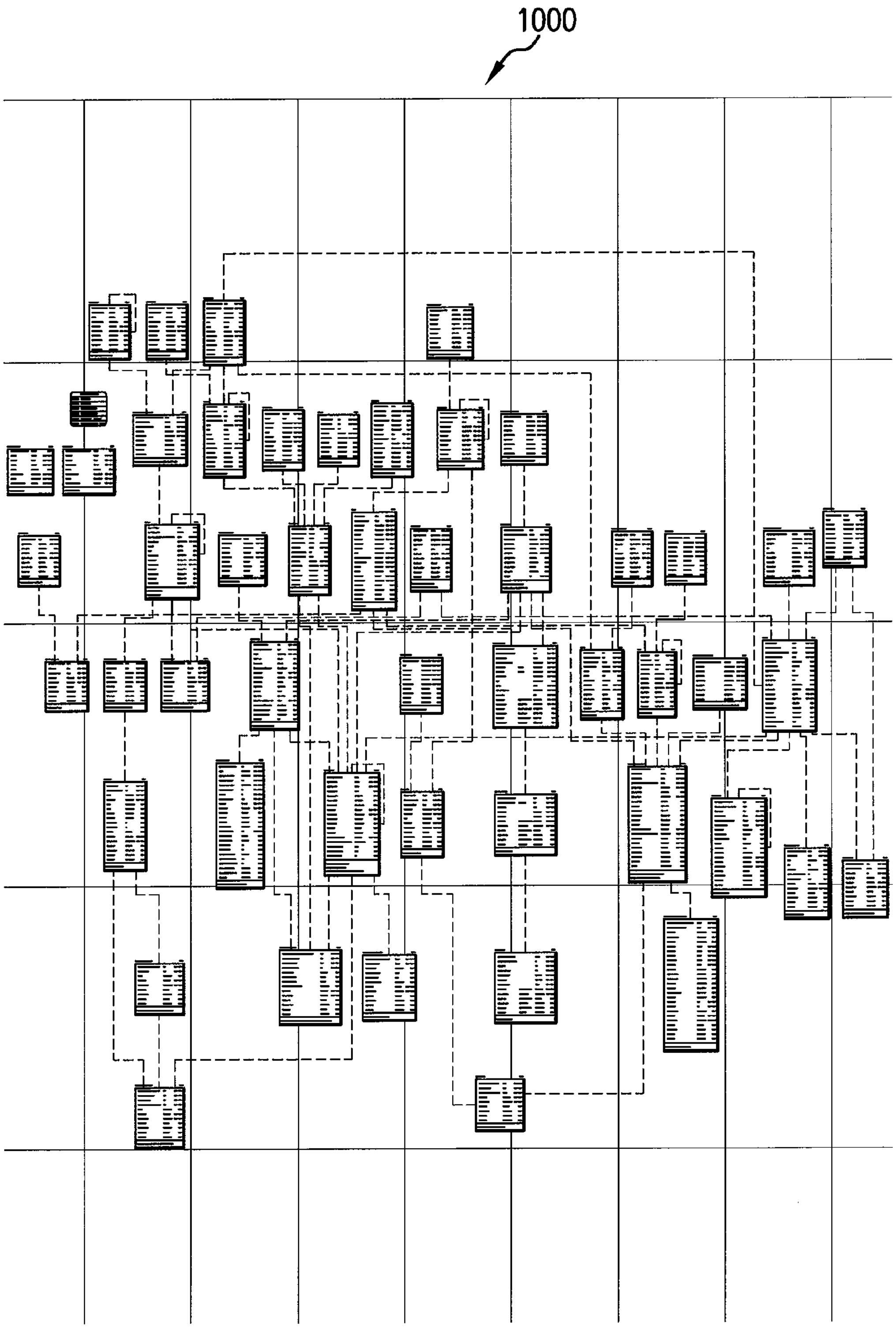
FIG. 10 is a context diagram for a database schema, according to one illustrated embodiment.

Referring to FIG. 10, a context diagram of a logical asset model 1000 is shown for the database schema 900 of FIG. 9, according to one illustrated embodiment.

FIGS. 11A-11E show screen prints of various windows or screens, individually referenced as **1100*a*-1100*e* and collectively referenced as 1100, of an Enterprise Environment module graphical user interface and/or of a Desktop Module. A user of a work station may be provided with the various windows or screens 1100. Among other things, the various windows 1100** permit the user of the work station to monitor, in real-time or substantially in real-time, activity on a gaming floor and/or activity at gaming machines. The gaming machines and other devices provide activity data, and/or other data, to the host computer via the network. The host computer routes the activity data and/or other data to respective servers. The respective servers may store the activity data, and/or other data, in their respective databases. In some embodiments, the gaming machines and other devices may provide activity data, and/or other data, to the work station via the network.

In some embodiments, the various windows permit the user of the work station to review activity on a gaming floor and/or activity at gaming machines using activity data, and/or other data, stored in the databases.

As described in detail below, the various screens 1100 provide, among other things, graphical representations, from various points of view, of a gaming floor and activity thereat. In addition to providing activity information, the various screens 1100 may be used to selectively provide detailed information such as, but not limited to, gaming device information and/or player information. Typically, the various screens 1100 provide a representation of a gaming floor and gaming devices thereon in a manner that generally corresponds to an actual lay-out of a gaming floor with gaming machines 110 disposed thereon and/or other actual aspects of the gaming floor such as, for example, representations of walls, staircases, doors, etc. Each graphical representation of a gaming device shown in the various screens **1100*a*-1100*e*** corresponds to a specific gaming machine.

Figure 11A:
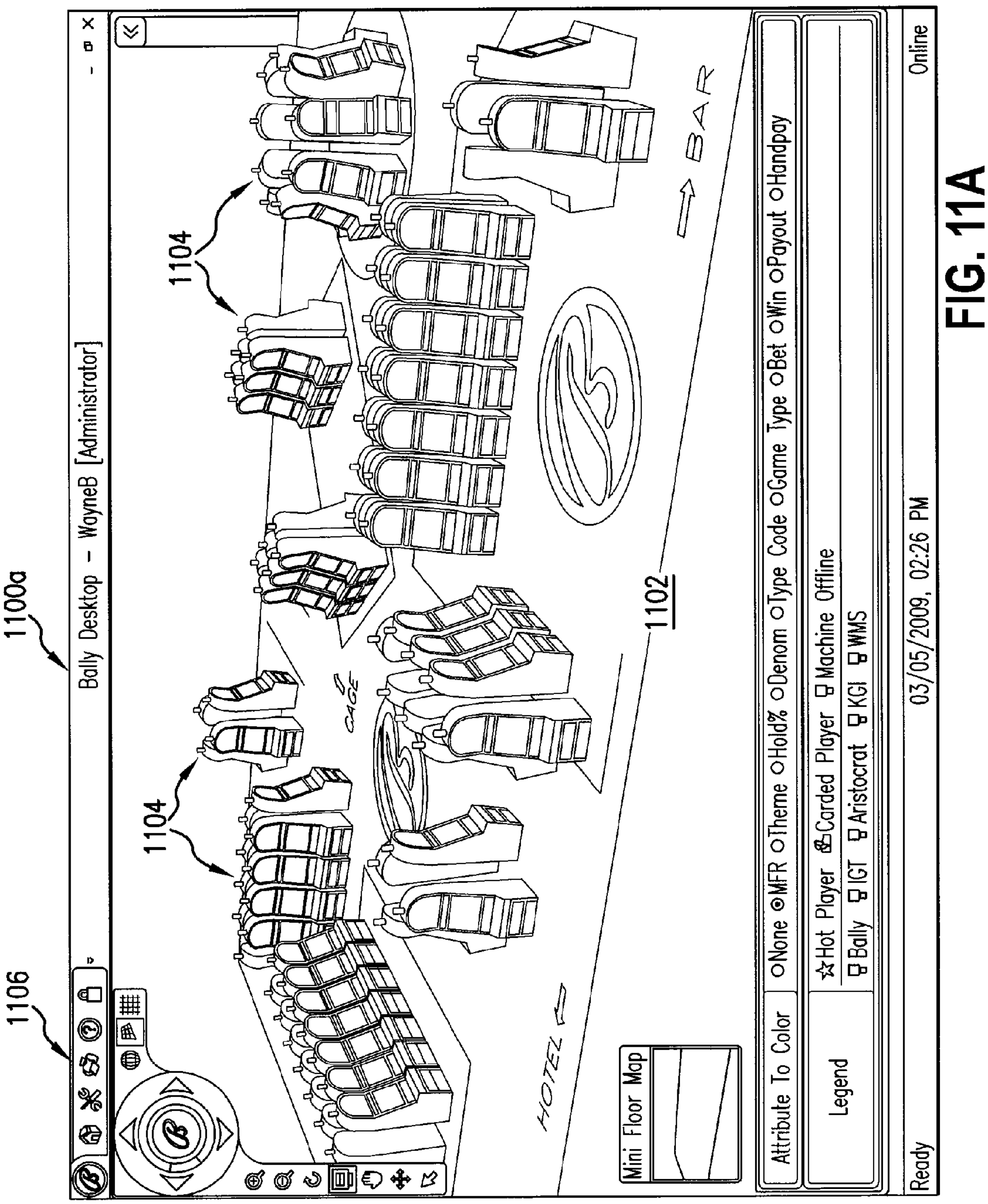
FIG. 11A-11E are screen prints of windows displaying multi-dimensional virtual views of a gaming floor, according to one illustrated embodiment.

Referring to FIG. 11A, a top level window or screen 1100*a* of an Enterprise Environment module graphical user interface is shown. The screen 1100*a* shows a three-dimensional graphical representation of a virtual gaming floor 1102 and three-dimensional virtual gaming machines 1104. The screen 1100*a* includes a tool bar 1106 generally located in a top left hand side corner of the screen 1100*a*. The tool bar 1106 includes various tools/buttons (e.g., "home"—for replacing screen 1100 with a "home" screen; "tools"—for configuring a "setup" of the user; "print"—for printing displayed information and/or files; "help"—for proving a user with information to assist the user in use of the Enterprise Environment module and/or Desktop Module; and "lock"—for locking attributes and/or setup information). The various tools/buttons in the tool bar 1106 are based upon population of the ribbon.

Figure 11B:
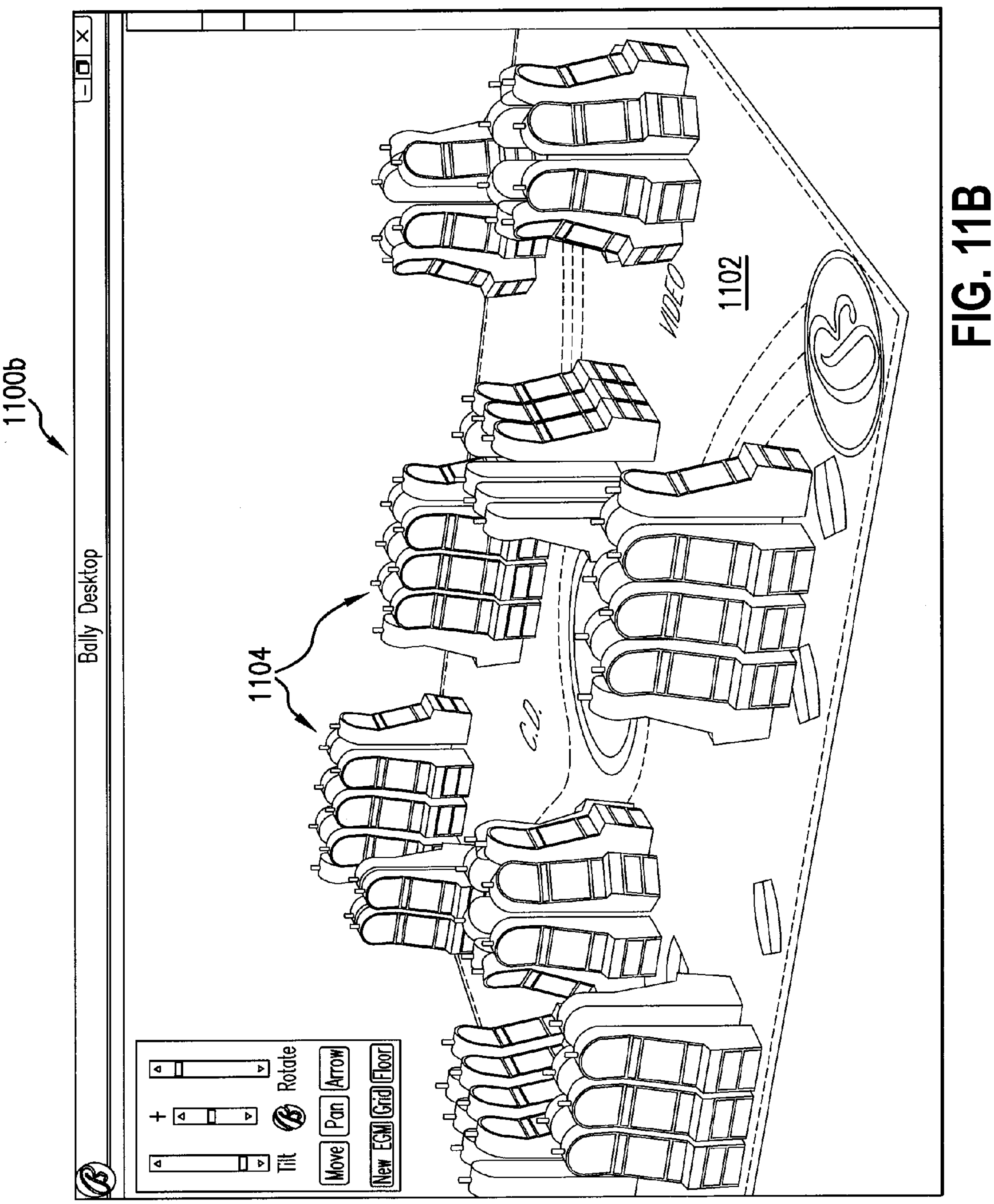

Referring to FIG. 11B, a screen 1100*b* of the Enterprise Environment module graphical user interface is shown. The screen 1100*b* shows a three-dimensional graphical representation of the virtual gaming floor 1102 and a number of the three-dimensional virtual gaming machines 1104. The screen 1100*a* shows the virtual gaming floor 1102 from a first point-of-view, and the screen 1100*b* shows the virtual gaming floor 1102 from a second point-of-view. A user may use various navigation tools such as zoom, tilt and pan to view the virtual gaming floor from a desired position.

Figure 11C:
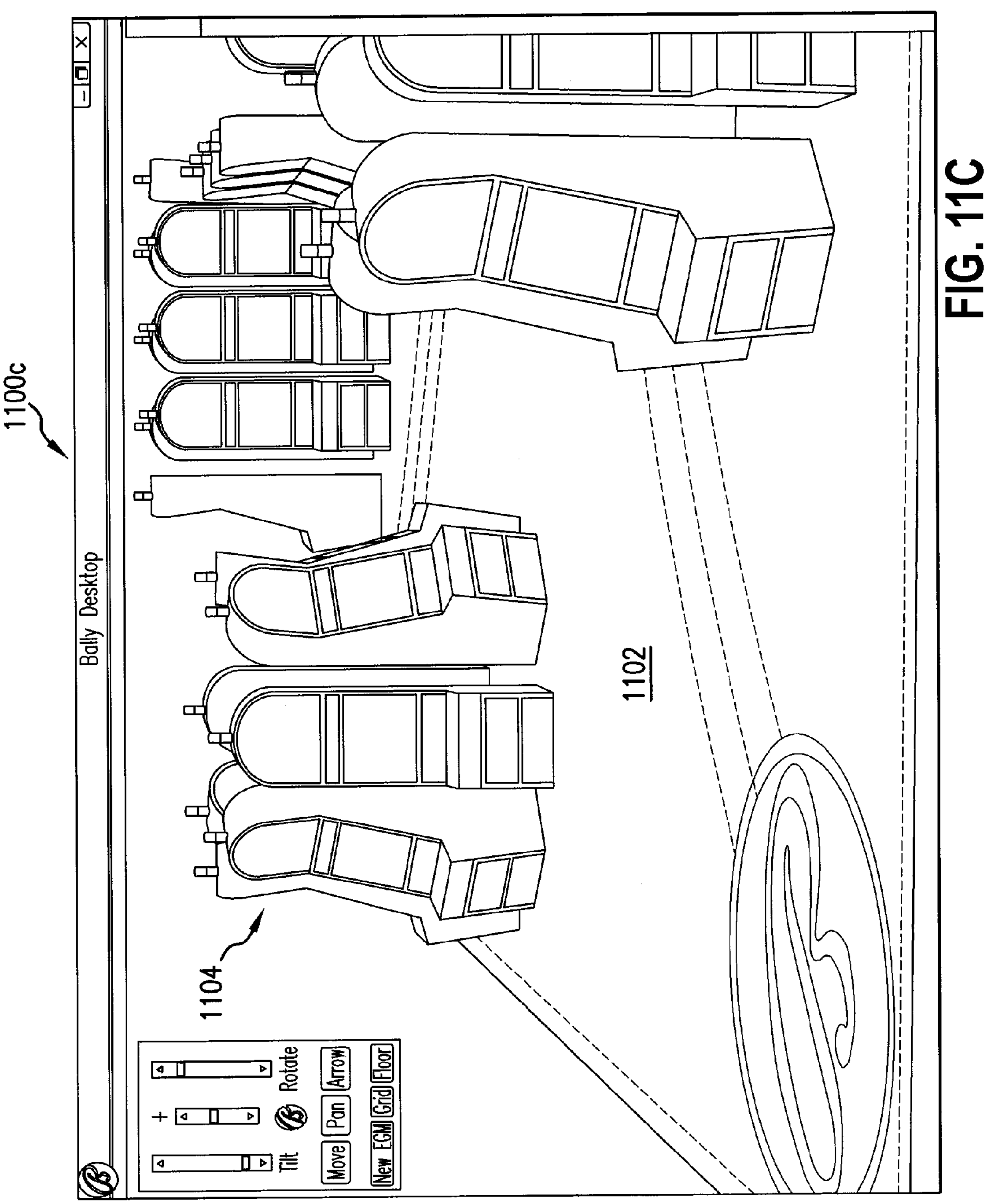

Referring to FIG. 11C, a screen 1100*c* of the Enterprise Environment module graphical user interface is shown. The screen 1100*c* shows a three-dimensional graphical representation of the virtual gaming floor 1102 and a number of the three-dimensional virtual gaming machines 1104 from yet third point-of-view.

Figure 11D:
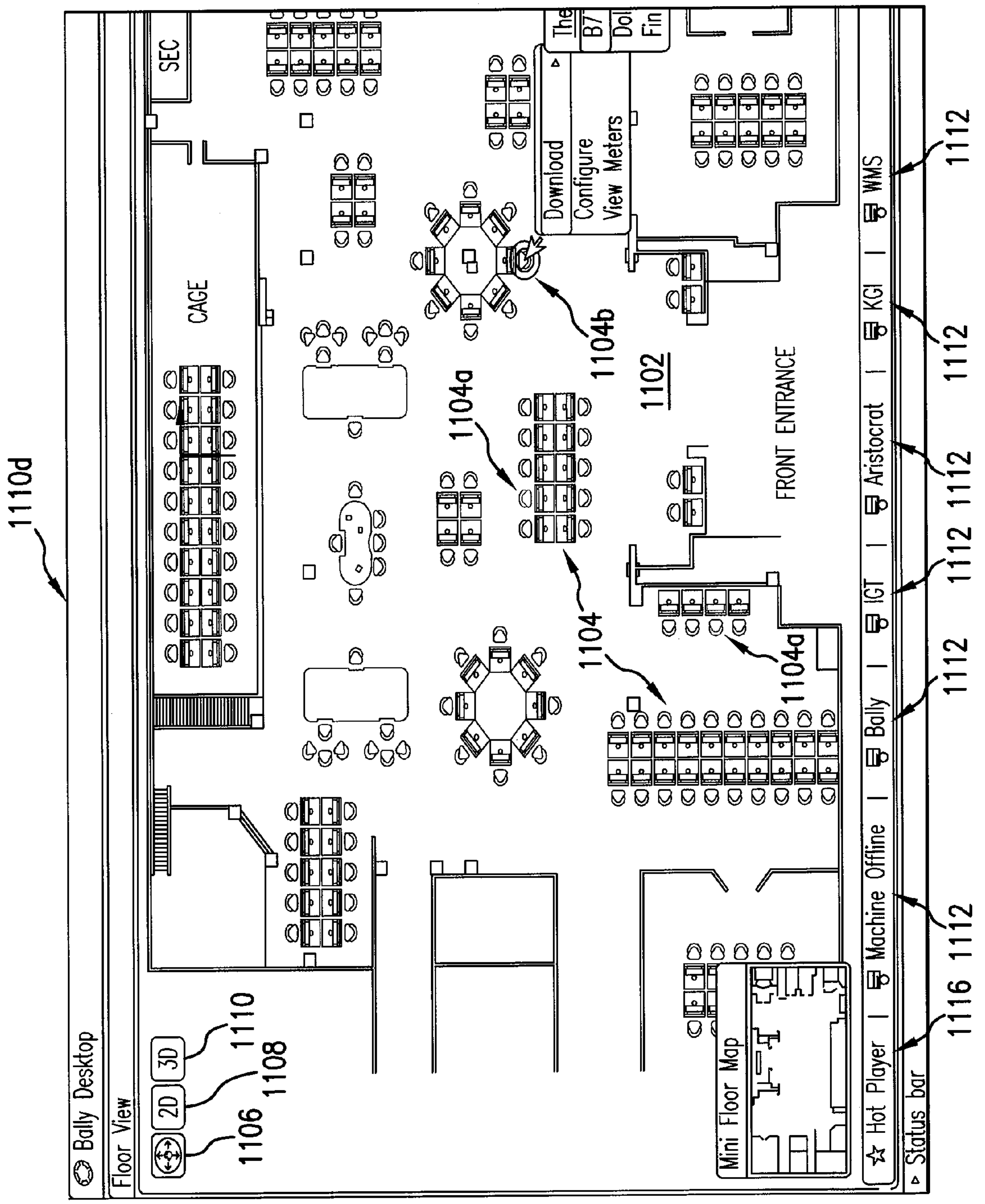

Referring to FIG. 11D, a screen 1100*d* of the Enterprise Environment module graphical user interface is shown. The screen 1100*c* shows a two-dimensional plan view of the virtual gaming floor 1102 and the virtual gaming machines 1104. The plan view of the virtual gaming floor 1102 and the virtual gaming machines 1104 corresponds to a point-of-view above the virtual gaming floor 1102 and the virtual gaming machines 1104.

The screen 1100*d* includes a navigation tool icon 1106, a two-dimensional view selector icon 1108 and a three-dimensional view selector icon 1110. The navigation tool icon 1106 enables the user to move (left/right, up/down) the point-of-view from which the virtual gaming floor 1102 is viewed. The navigation tool icon 1106 may also enable the user to move the point-of-view from which the virtual gaming floor 1102 is viewed toward (zoom in) and away from (zoom out) the virtual gaming floor 1102.

The two-dimensional view selector icon 1108 and the three-dimensional view selector icon 1110 enable a user to select between viewing the virtual gaming floor 1102 in two- or three-dimensions.

The screen 1100*d* may also show virtual gaming machines differently, for example by different colors, where the different colors may represent different manufactures. Gaming machine manufacturers' icons 1112 arranged near the bottom of the screen 1100*d*. The gaming machine manufacturers' icons 1112 help the user identify which of the virtual gaming machines 1104 are from which manufactures. The virtual gaming machines 1104 may be displayed on the virtual gaming floor 1102 in accordance with the gaming machine manufacturers' icons 1112.

The screen 1100*d* may also show a gaming machine Offline icon 1114 to help the user identify which of the virtual gaming machines 1104 are correspond to an actual gaming machine that is offline. The offline virtual gaming machines 1104 may be displayed on the virtual gaming floor 1102 in accordance with the gaming machine Offline icon 1114. For example, virtual gaming machines 1104*a* are displayed as being offline.

The screen 1100*d* may also show a special player icon 1116. The special player 1116 may be displayed on the gaming floor to represent the location of an actual player on an actual gaming floor. The special player icon 1116 may represent a player on winning streak (a "hot" player) or a player on a losing streak (a "cold" player).

The screen 1100*d* may also provide the user with the capability to select, manage, control, configure, etc. an actual gaming machine on an actual gaming floor by the user selecting a specific virtual gaming machine and selecting various options. For example, virtual gaming machine 1104*b* has been selected, and various menus appear on the screen 1100*d*.

Figure 11E:
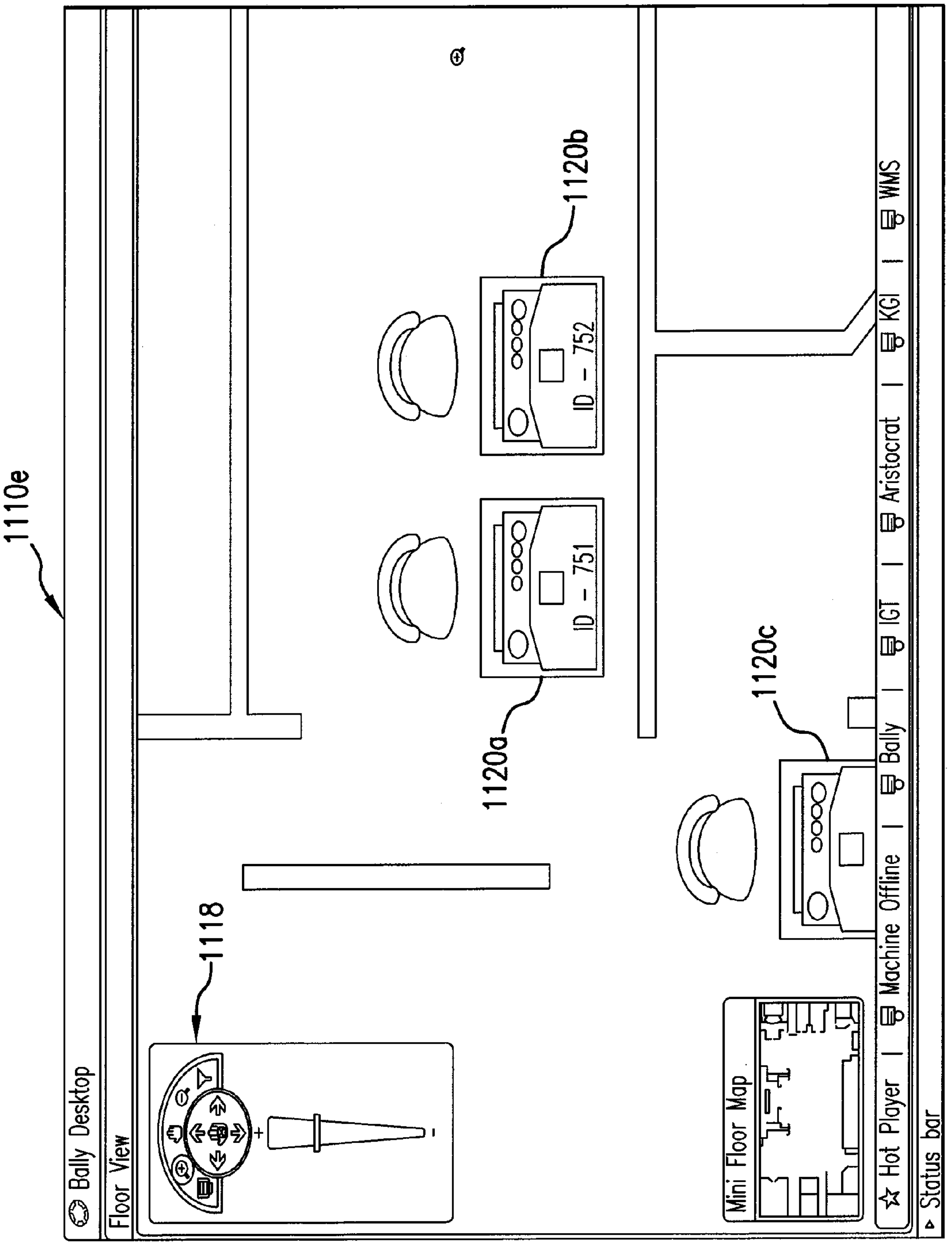

FIG. 11E shows a screen print of a screen 1100*e*. The screen 1100*e* provides a two-dimensional representation of a portion of a virtual gaming floor 1102, as seen from above. The screen 1100*e* includes a panning/zoom/tilt selector 1118 and shows three multi-dimensional virtual gaming machines 1120*a*-1120*c*, as viewed from above. The panning/zoom/tilt selector 1118 has been utilized to zoom onto the three multi-dimensional virtual gaming machines 1120*a*-1120*c* such that the three multi-dimensional virtual gaming machines 1120*a*-1120*c* are shown isolated from other multi-dimensional virtual gaming machines. The screen 1100*e* shows multi-dimensional virtual gaming machines 1120*a* and 1120*b* are associated with ID 751 and ID 752, respectively. Typically, a respective gaming machine 110 and a respective multi-dimensional virtual gaming machine 1120 are associated with a common identifier (ID).

Color coding may be utilized to identify the multi-dimensional virtual gaming machines 1120*a*, 1120*b* as Bally manufactured (Red color) and the third multi-dimensional virtual gaming machine 1120*c* may be colored Yellow to indicate a "special" player such as a hot player.

Figure 12:
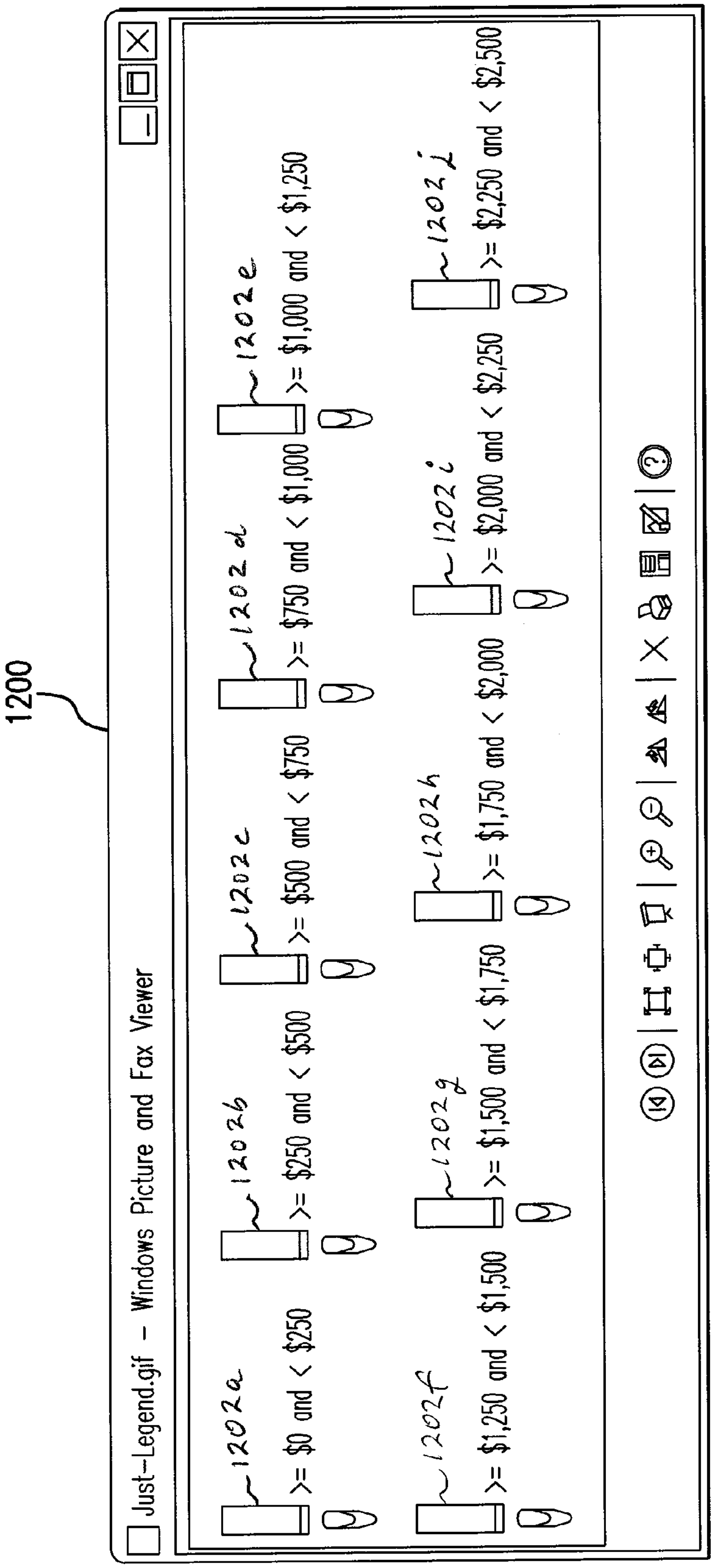
FIG. 12 is a screen print of a window providing a selectable view of players in accordance with the amount of winnings, according to one illustrated embodiment.
Figure 13:
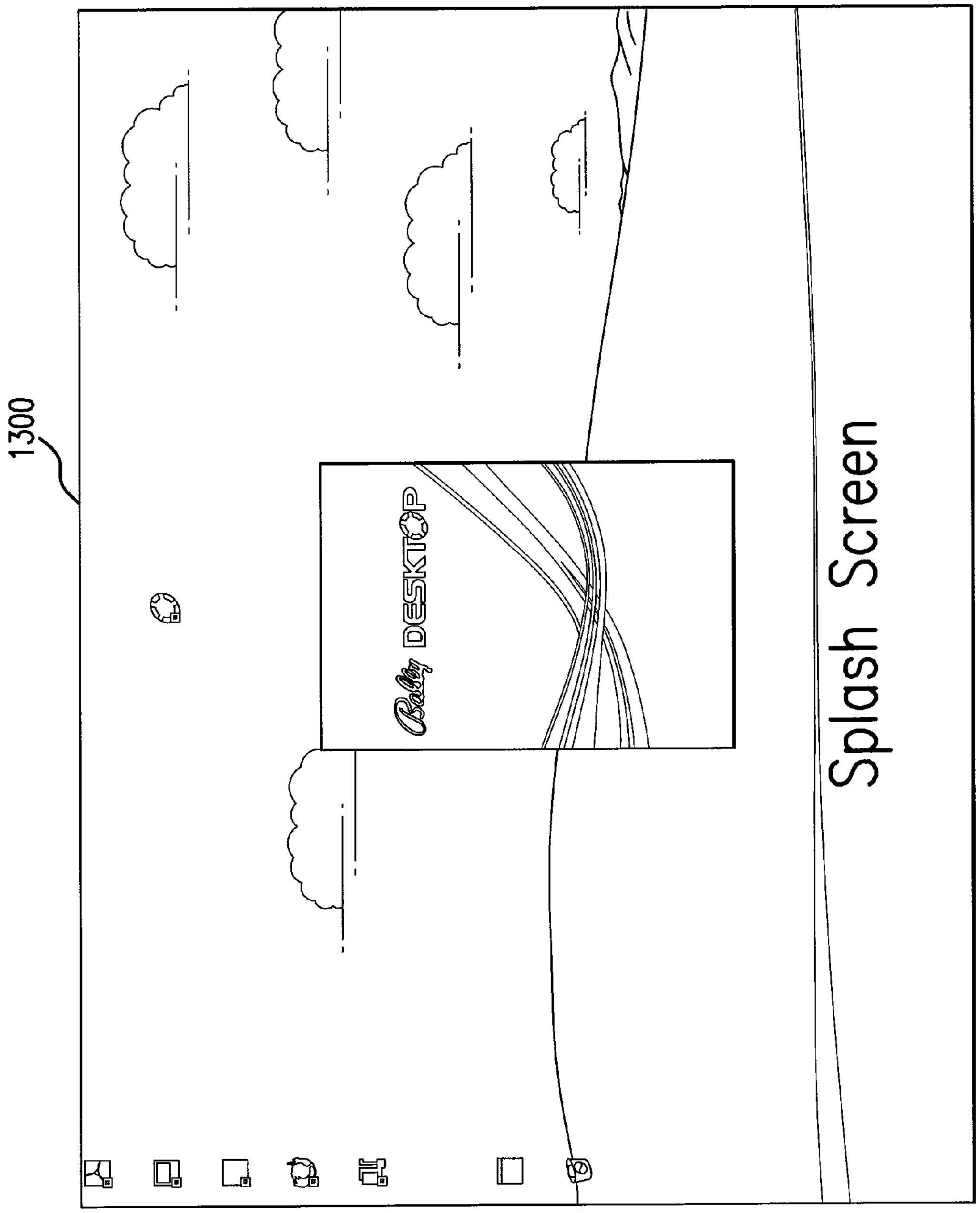
FIG. 13-23 are example screenshots shown which may be displayed using the Desktop Module in conjunction with the Enterprise Environment module, according to one illustrated embodiment.

Referring to FIG. 12, a screen print of a window 1200 is shown. The window 1200 provides a user at the control station a selectable view of players in accordance with the amount of winnings that has occurred during a period and allows the identification of "special" players such as hot players, such as shown in FIG. 11E. The window 1200 displays a number of winning range icons 1202*a*-1202*j*. The winning range icon 1202*a*-1202*j* may be color coded such that the winning range icons 1202 have different colors. In one embodiment, the colors of the winning range icons 1202 are sequentially arranged in a graduated scale to correspond to values of the winning range icons. In other words, winning range icon 1202*a*, which has the lowest range, is a first color, and winning range icon 1202*j*, which has the highest range, is a second color, and the colors of the winning range icons 1202*b*-1202*i* are graduated from the first color to the second color.

Utilizing the live feed (LF) or real-time data, calculations may be made to determine and display one or more hot players or hot gaming machines based on deviations from the mean. Display of hot games or players may be made using a graduated color scheme with legend buckets auto derived for human readable ranges. An example approach is described.

A feed is generated from an SMS (Slot Management System) system that contains periodic meter data including coin in (aka the amount a player has bet on the machine so far today). Player card numbers may be tied to the data to calculate rate of bet per time by player and/or machine. Using accepted statistical methods, calculate the percentile for each machine or player. Games or machine above a user configurable percentile, say 95%, are considered hot. This hotness is rendered on a graphical display by labeling or coloring the game. For example, a player can be shown as hot by placing a graphic of chili pepper in the game's chair.

Another aspect may include colorizing a floor view of all games showing the distribution of performance for metered values such as coin in, coin out or win.

Examples of the two algorithms may be illustrated as follows:

The first is to use the percentiles calculated in concept one and color games based on buckets that represent the percentile 0-10, 10-20, 20-30 etc though 90-100. This gives 10 buckets and ten colors to label in the legend. The colors are calculated by choosing a start and end color (say yellow and red) and then calculating intermediate colors in an even range between them. One can get more variation by choosing a third color, say violet. Then get a continuous graduation by using the first half to go from yellow to red and the second half from red to violet.

The second algorithm is used to represent actual values. The values min and max are not known ahead of time and may be negative. First we calculate the range by subtracting the min for the max. Two constants are defined for input, kMinBucketSize and KMaxNumberOfBuckets to guide the calculations. An initial bucket size is calculated by dividing the range by the KMaxNumberOfBuckets. This value is then rounded up to the next even power of ten by taking the power(base 10), of the Log(base ten)+1 of itself. As this bucket size will typically result in fewer buckets then the ideal (KMaxNumberOfBuckets), we continuously divide the size by 2 until we have at least KMaxNumberOfBuckets/2. In the end bucket sizes have nice human understandable values like 10, 25, 50, or 100. This algorithm can be implemented, such as by using C# code, as in this pseudo-code fragment:

```
// Calculate the ranges and proposed bucket sizes
   fullRange = newMax − newMin;
   bucketSize = kMinBucketDollars;
   roundTo = kMinBucketDollars;
   exactBucketSize = fullRange / kMaxNumberOfBuckets;
// Round to a power of 10.
// Adjust the min and max and bucket size to nice whole number
// Can divide bucket size by two or even four or eight if there
would be too few
// Return the next largest integer that is greater or equal than start
but evenly divisible by roundTo
// Return the next smallest integer that is less or equal start but
evenly divisible by roundTo
```

Once we have buckets, colors are assigned using a graduated scale as in the first algorithm. This could appear on screen as shown here with $250 buckets as shown in FIG. 12. Various shades and colors may be associated with each bucket group including 0-<$250, $250-<$500, etc. ('<' defined as less than).

Referring generally to FIGS. 13-23, screen prints of windows or screens 1300-2300, respectively, are shown. Theses windows or screens may be displayed using the Desktop Module in conjunction with the Enterprise Environment module. Upon startup at a user control station, a Splash screen 1300 may identify the startup of the Desktop Module as in FIG. 13, according to one illustrated embodiment.

By clicking on the respective buckets, the user may navigate to additional display pages which may include a view of the floor as shown in FIG. 11 and identifying the location and other specific information about the players, such as the amount of winnings during the current session, average winnings/losses per session, and total winning/losses over a selected playing history of the player.

Figure 14:
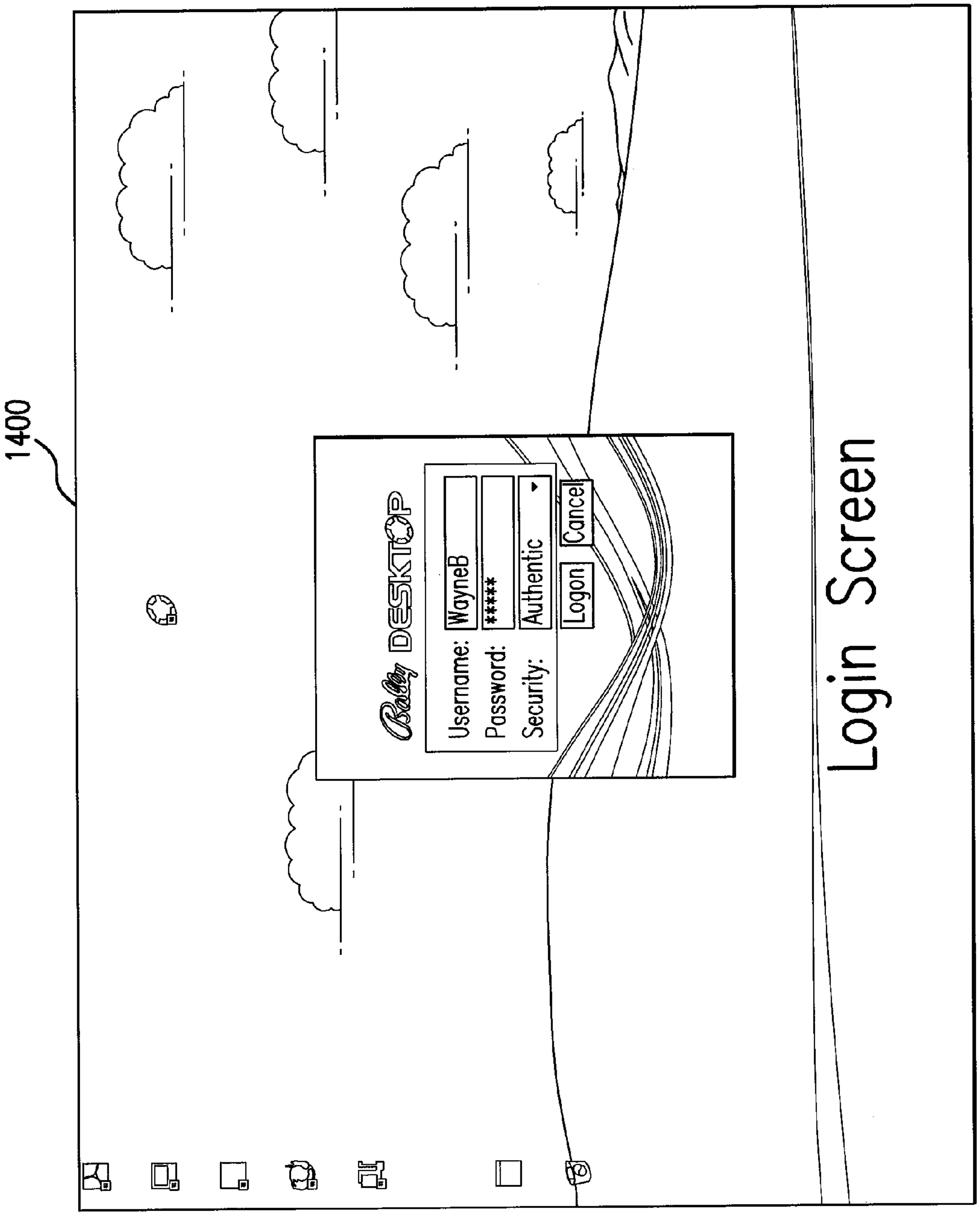

The Splash screen 1300 may be followed by a Login Screen 1400, as shown in FIG. 14, according to one illustrated embodiment. The Login Screen 1400 prevents an unauthorized user from accessing the control station data or modifying any portion of the networked gaming system without a validated username and password as shown in FIG. 14.

Figure 15:
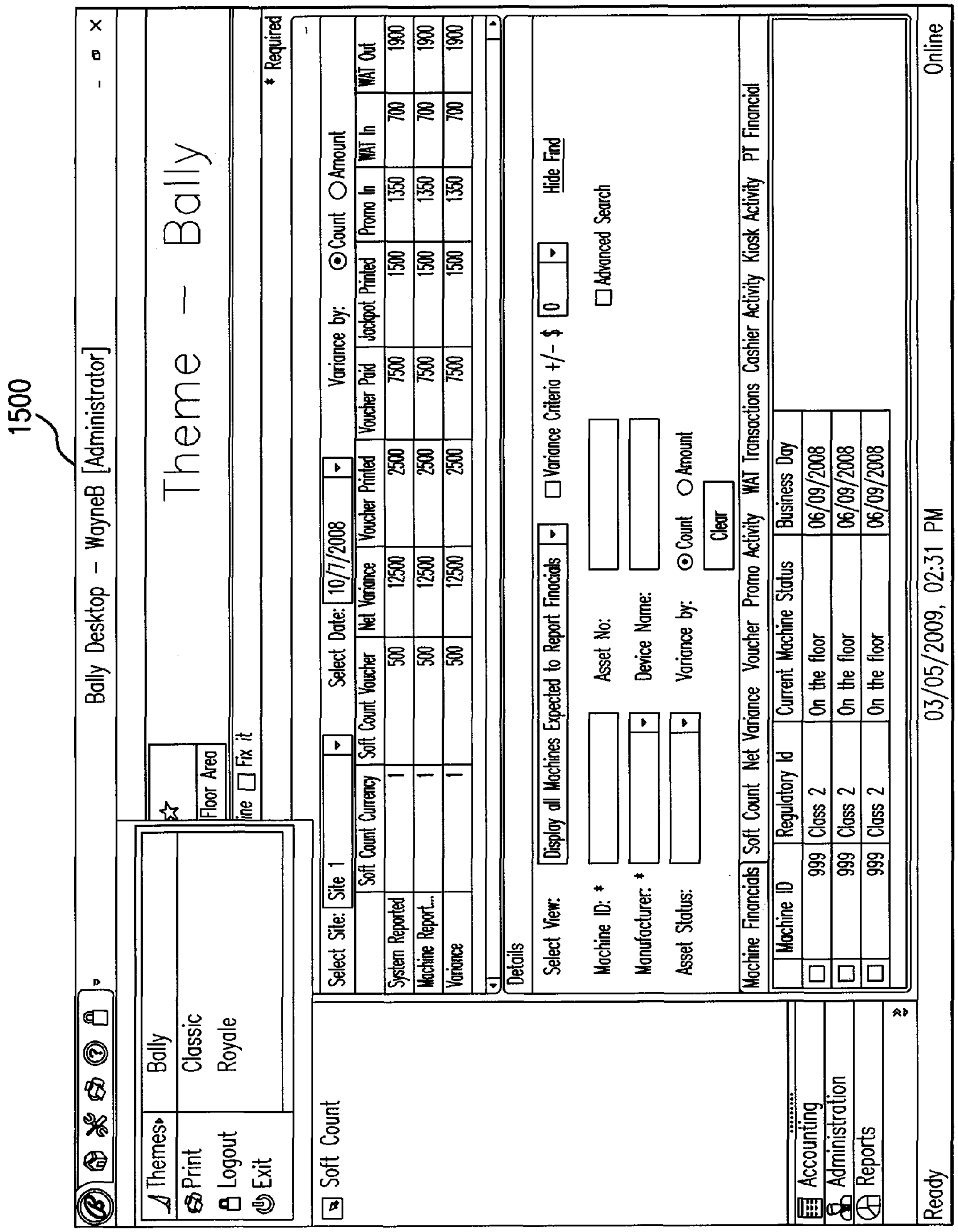
Figure 16:
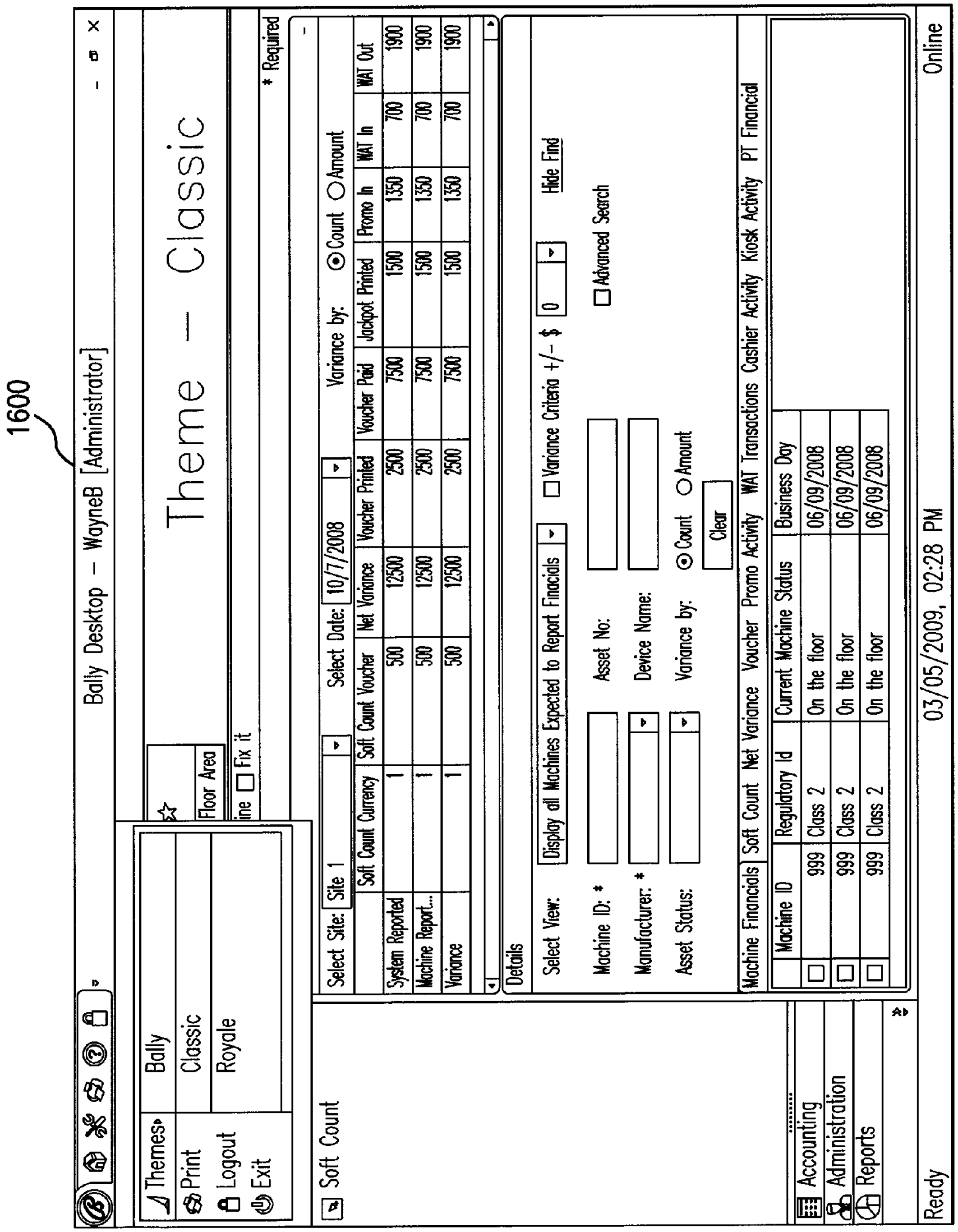
Figure 17:
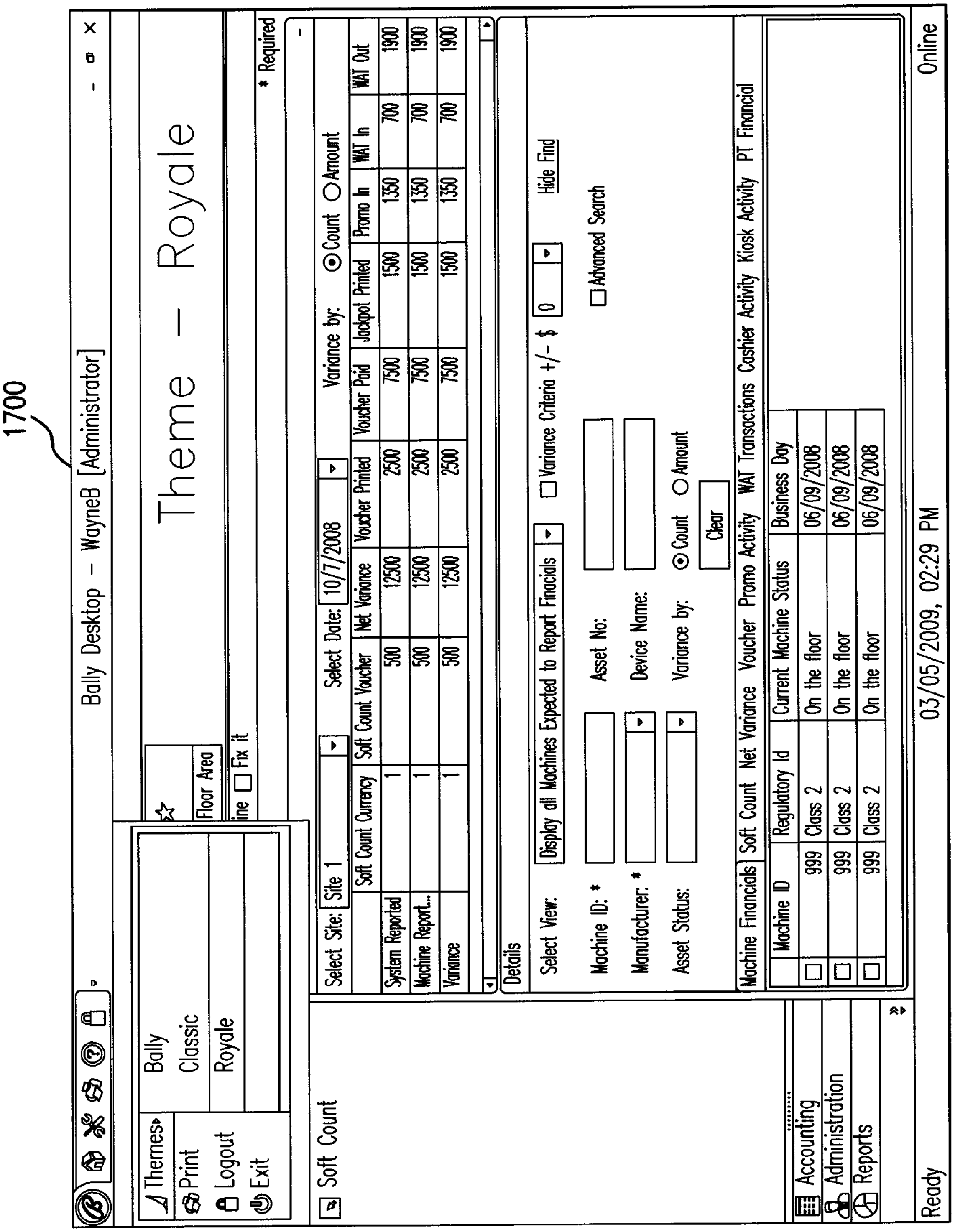

After entry and verification of a valid username and password, a Theme screen 1500, 1600, 1700 may be displayed, such as shown in FIG. 15 (Bally Theme), FIG. 16 (Classic Theme), or FIG. 17 (Royale Theme), according to one respective illustrated embodiment. The Theme screen 1500, 1600, and 1700 may depend upon the preferences of the user. A user may select a respective Theme screen, and the name of the selected Theme screen may be shown in the upper right hand area of the respective screens.

The Theme screen 1500, 1600, and 1700 provides various selectable areas for accessing and displaying various data and images, such as a virtual floor. From the Theme screen 1500, 1600, 1700, a virtual floor may be displayed.

Figure 18:
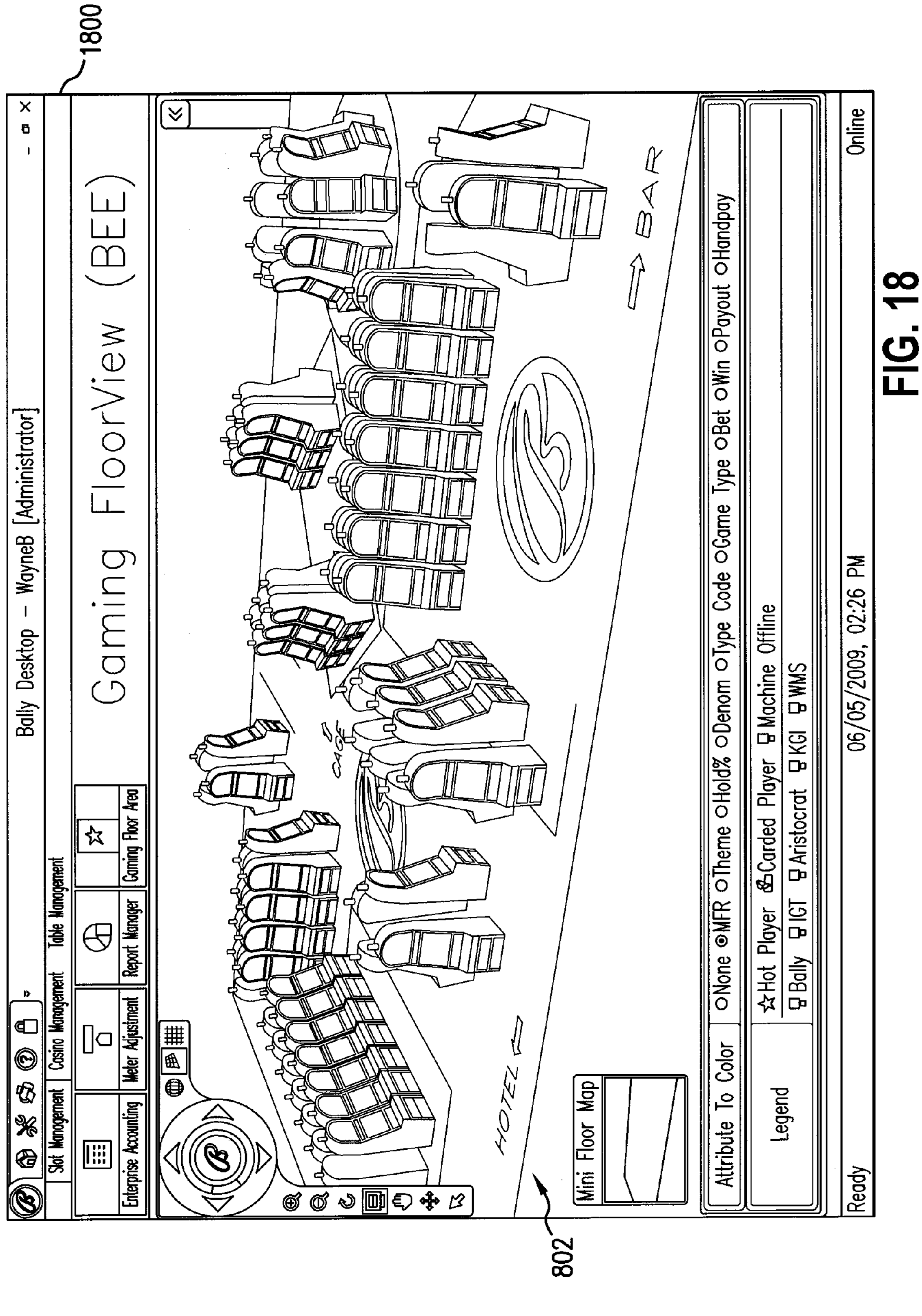

Referring to FIG. 18, a window 1800 displays an exemplary virtual floor plan 1802 that may be displayed to show the entire or selected portions of one or more gaming floors connected to the network.

From the Theme screen 1500, 1600, 1700, a user may, among other thing, access data and adjust elements of a gaming environment.

Figure 19:
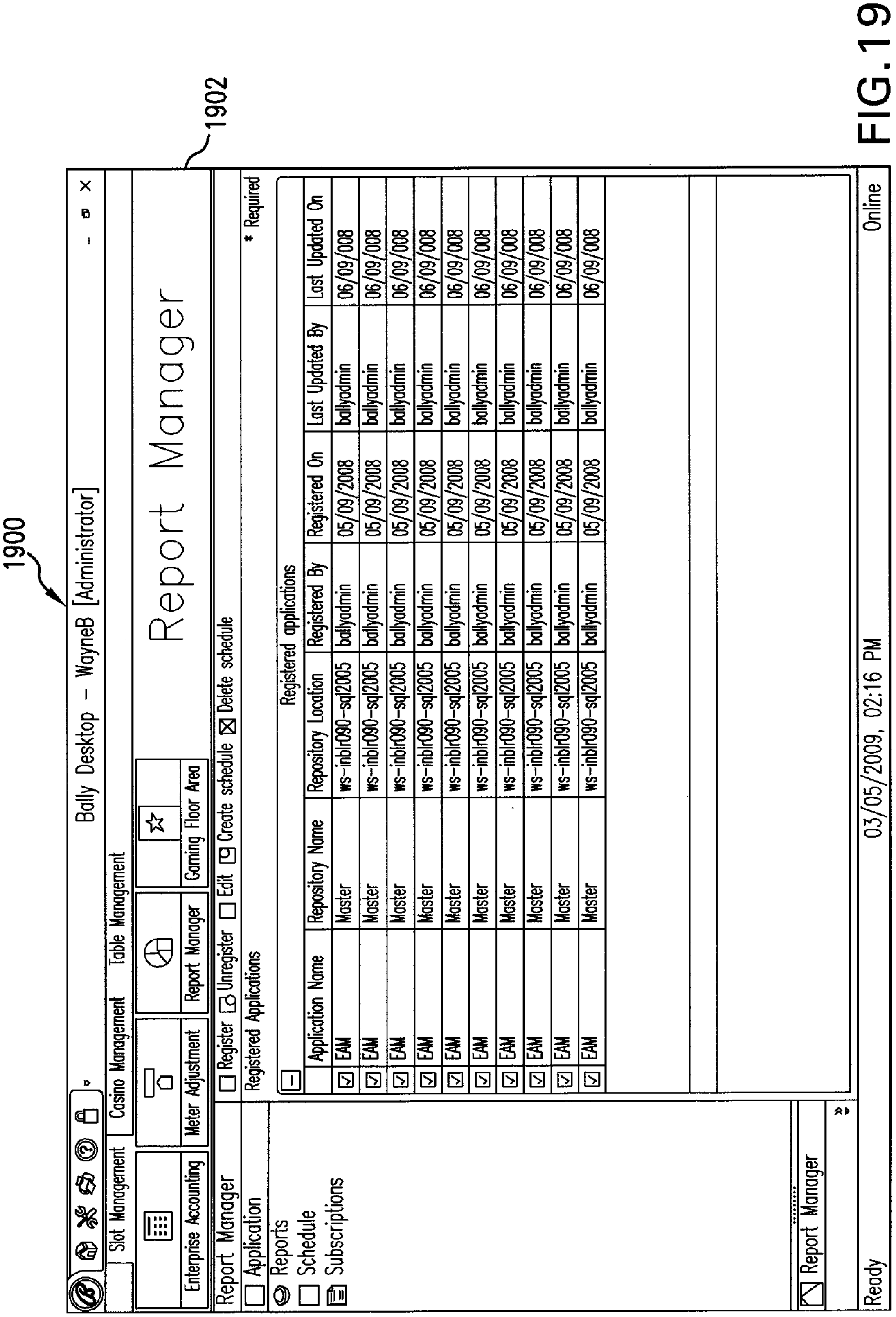

FIG. 19 is a screen print of a window 1900 for generating a report, according to one illustrated embodiment. The window 1900 may include a Report Manager 1902 that may generate and display a report.

Figure 20:
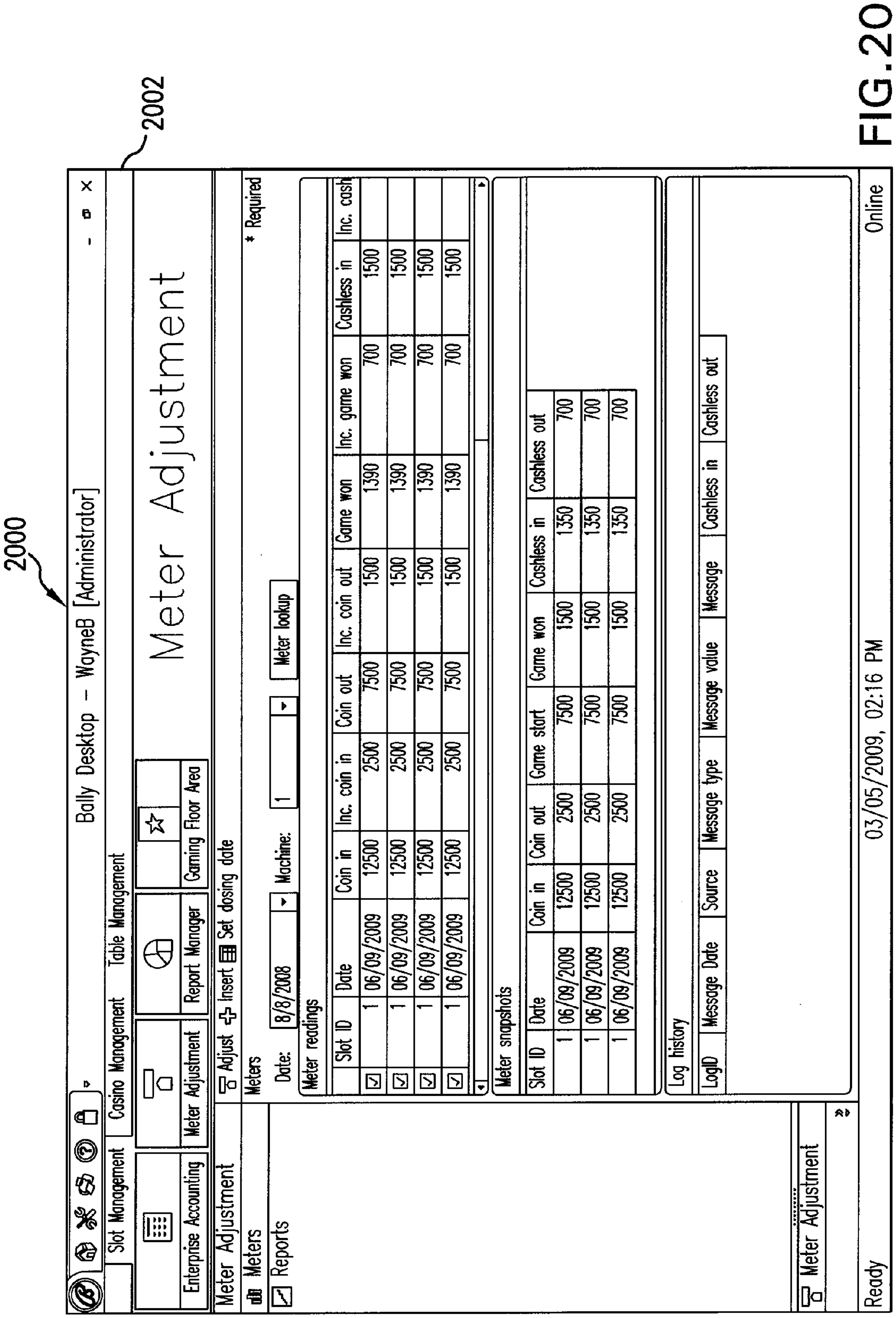

FIG. 20 is a screen print of a window 2000 for controlling/adjusting elements of the gaming environment, according to one illustrated embodiment. The window 2000 may include a Meter Adjustment 2002 with which the user may control/adjust elements of the gaming environment.

Figure 21:
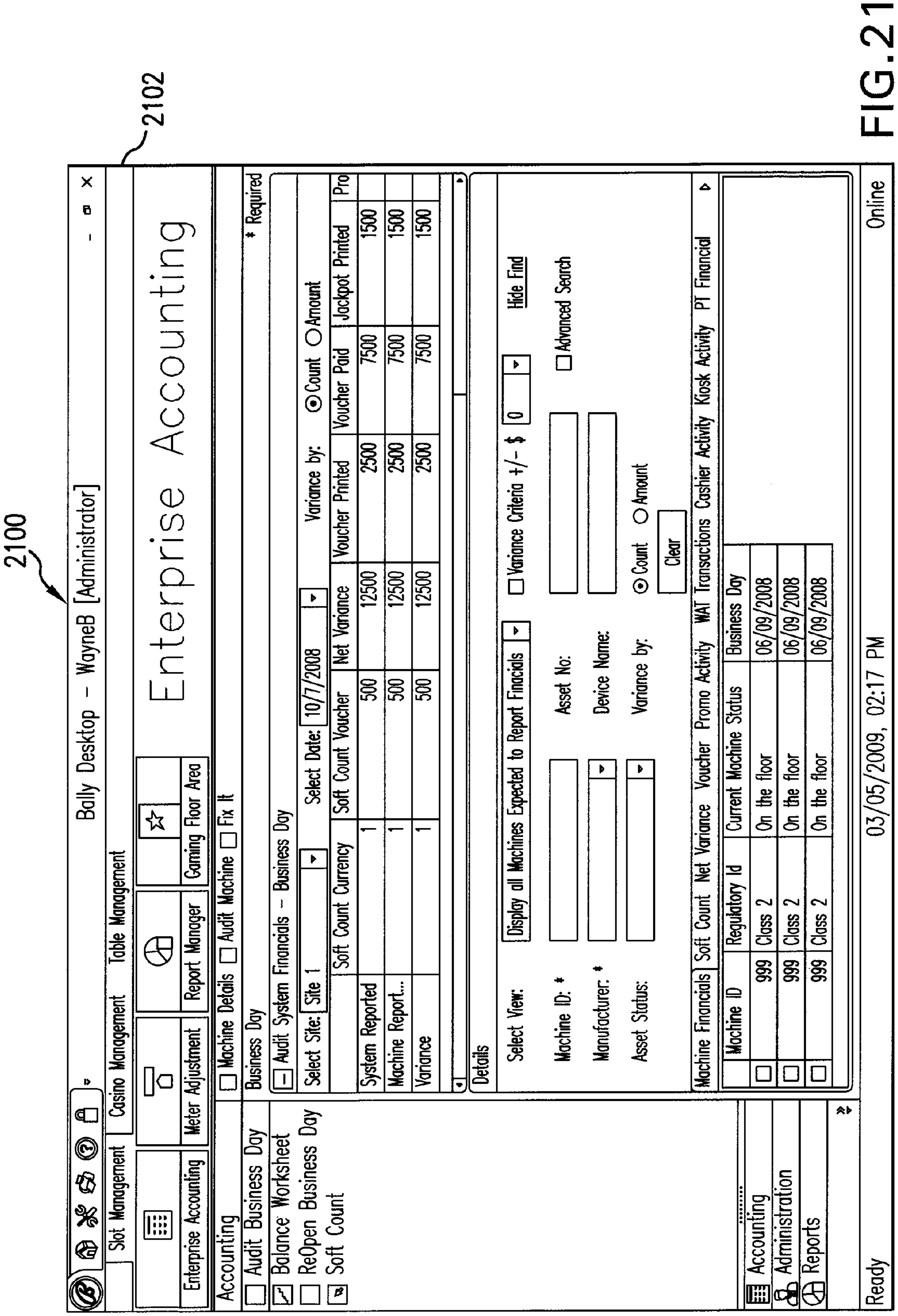

FIG. 21 is a screen print of a window 2100 having an Enterprise Accounting screen 2102, according to one illustrated embodiment.

Figure 22:
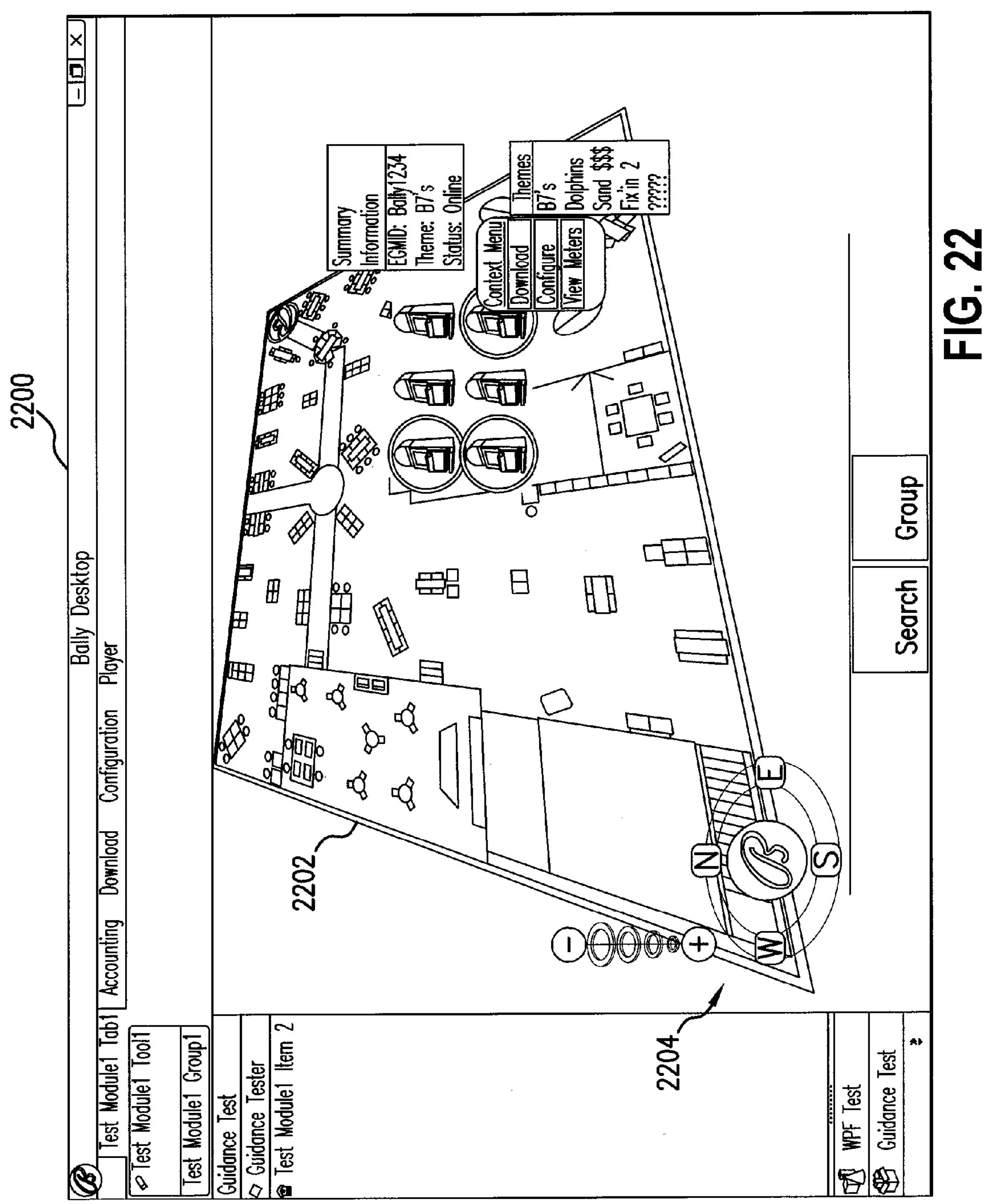

FIG. 22 is a screen print of a window 2200 for, among other things, displaying a virtual floor, according to one illustrated embodiment. The window 2200 includes a virtual floor screen 2202 which may be adjusted using a zoom/pan/tilt icon 2204.

Figure 23:
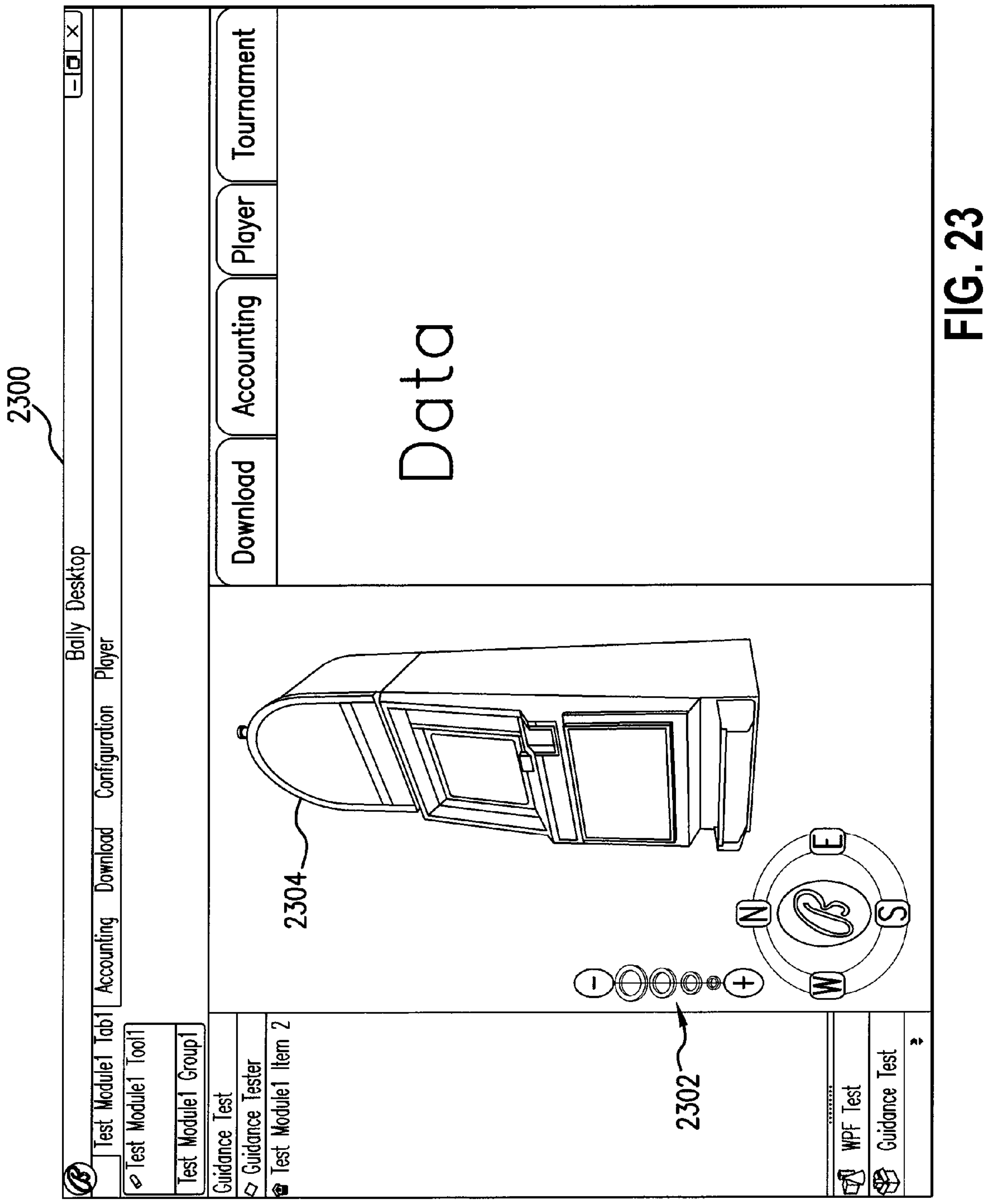

FIG. 23 is a screen print of a window 2300 for, among other things, displaying a portion of a virtual floor, according to one illustrated embodiment. The window 2300 includes a zoom/pan/tilt icon 2302 that may be used to identify individual gaming machines 2304, drop down associated data, and sequentially review individual gaming machines.

Although the description above contains certain specificity, the described embodiments should not be construed to be the scope of the disclosed invention; the descriptions provide an illustration of certain preferred embodiments. The scope is determined by the claims and their legal equivalents.

The invention claimed is:

1. A method of displaying gaming activity to a user of a control station communicatively coupled to a plurality of physical gaming machines disposed about a gaming floor, the method comprising:

calculating a range of values (R) corresponding to wagering activity at the plurality of physical gaming machines with a processor of a computing device, the range of values defined by a minimum range value and a maximum range value;

calculating a value of a divisor (D) by which to divide the range of values with at least one processor of a computing device, where the divisor (D) is greater than one (1);

calculating a quotient and a remainder from division of the range of values (R) by the divisor (D) with the at least one processor of the computing device;

color coding a respective first icon of an approximately D number of first icons with a respective color of an approximately D number of colors of a graduated color scale, each respective first icon corresponding to a respective subrange of an approximately D number of subranges of the range of values, wherein the approximately D number of subranges are ordered from a lowest subrange to a highest subrange, and wherein the approximately D number of first icons are color coded in accordance with the order of the subranges and the graduated color scheme; and displaying a first number of first icons on a display device of the control station.

2. The method of claim 1, further comprising:

calculating the graduated color scale starting at the first color and ending at the second color; and defining a number (N) of subranges of the range of values (R) to approximately span the range of values (R), the respective subranges being of approximately equal size and approximately equal to the quotient, and where the number (N) is approximately equal to the value of D.

3. The method of claim 1 wherein calculating a range of values (R) corresponding to wagering activity at the plurality of gaming machines further includes:

receiving respective game play data corresponding to wagering activity for respective gaming machine of the plurality of gaming machines;

determining a respective maximum value and a respective minimum value of a measured quantity based at least on the respective game play data; and estimating the range of values as a difference between the respective maximum value and the respective minimum value of the measured quantity.

4. The method of claim 1, further comprising:

determining whether the remainder is above a threshold value; and only if the remainder is above the threshold value, adjusting at least one of the minimum range of values, the maximum range of values and the value of the divisor (D), and repeating the calculating a range of values (R) and the calculating a quotient and a remainder based at least on the at least one adjusted minimum range of values, the maximum range of values and the value of the divisor (D).

5. The method of claim 4, further comprising:

repeatedly adjusting at least one of the minimum range of values, the maximum range of values and the value of the divisor (D) and calculating the range of values (R) and the calculate the quotient and the remainder until the remainder is at least equal to the threshold value.

6. The method of claim 1, further comprising adjusting the minimum range value and the maximum range value to have respective integer values.

7. The method of claim 1, further comprising adjusting the divisor to have an integer value.

8. The method of claim 1, further comprising:

calculating a respective measured quantity for at least one respective gaming machine of the plurality of gaming machines based at least on respective game play data indicative of wagering activity for the respective gaming machine, wherein each respective measured quantity has a respective value included in a respective one of the subranges;

for each respective gaming machine of the at least one respective gaming machine, color coding a respective second icon with a respective color of the number of colors based at least on the respective subrange that includes the respective measured quantity for the respective gaming machine and the graduated color scheme, wherein the respective second icon is color coded in accordance with the order of the subranges and the graduated color scheme; and displaying the at least one second icon on the display device.

9. The method of claim 8 wherein displaying the at least one second icon, includes:

displaying a multi-dimensional graphical representation of at least a portion of the gaming floor, the portion of the gaming floor being defined by an outer peripheral boundary, each respective gaming machine of the at least one gaming machine located at a respective position within the outer peripheral boundary that defines the portion of the gaming floor; and displaying a respective multi-dimensional graphical representation of a respective gaming machine for each at least one second icon.

* * * * *